United States Patent
Kalra et al.

(10) Patent No.: US 12,499,872 B2
(45) Date of Patent: Dec. 16, 2025

(54) GENERATING DATA FEATURES FROM SPEECH AND SENTIMENT ANALYTICS FOR ENHANCED PREDICTIVE ROUTING

(71) Applicant: GENESYS CLOUD SERVICES, INC., Menlo Park, CA (US)

(72) Inventors: Manan Kalra, Galway (IE); Emir Munoz, Galway (IE); Greg Toth, Galway (IE); David Farrell, Galway (IE)

(*) Notice: Subject to any disclaimer, the term of this patent is extended or adjusted under 35 U.S.C. 154(b) by 180 days.

(21) Appl. No.: 18/393,642

(22) Filed: Dec. 21, 2023

(65) Prior Publication Data

US 2025/0210034 A1 Jun. 26, 2025

(51) Int. Cl.
*G10L 15/02* (2006.01)
*G06F 40/35* (2020.01)
(Continued)

(52) U.S. Cl.
CPC .......... *G10L 15/063* (2013.01); *G06F 40/35* (2020.01); *G10L 15/16* (2013.01); *G10L 15/28* (2013.01); *G10L 25/78* (2013.01)

(58) Field of Classification Search
CPC ........ G06F 40/30; G06F 40/35; G06F 40/284; G06F 16/685; G06F 40/205; G06F 40/279; G06F 16/61; G06F 40/16; G06F 16/953; G06F 16/65; G06F 16/638; G10L 15/26; G10L 15/063; G10L 15/1815; G10L 15/22; G10L 2015/088; G10L 15/1822; G10L 2015/227; G10L 2015/0638; H04M 3/5175; H04M 2201/40; H04M 3/42221; H04M 3/5233; H04M 2203/401; H04M 3/5191; H04M 3/5166; H04M 3/5183; H04M 3/4936; H04M 2203/406; H04M 2203/551; H04M 2203/552

See application file for complete search history.

(56) References Cited

U.S. PATENT DOCUMENTS 12,062,368 B1 * 8/2024 Arora ................. G10L 15/1822
2020/0137231 A1 4/2020 Revanur et al.
(Continued)

OTHER PUBLICATIONS

International Search Report and Written Opinion received in the co-pending PCT application, having application No. PCT/US2024/058919, received Jan. 22, 2025.

*Primary Examiner* — Olujimi A Adesanya

(57) ABSTRACT

A method for processing data for training a predictive routing model. The method includes receiving interaction data from previous interactions that includes audio data capturing a conversation and transcript data of the conversation. The method continues by performing speech analytics by processing the audio data to determine scores for speech metrics that include a measure of how much the agent or customer speaks during the conversation. The method continues by performing sentiment analysis to determine scores associated with sentiment metrics, the sentiment metrics including a measure of a sentiment based on classifying utterances appearing in the transcript data as being positive or negative. The method continues by performing feature engineering to generate feature data and generating a training dataset therefrom. The method continues by applying a machine learning algorithm to the training dataset to train a predictive routing model.

20 Claims, 10 Drawing Sheets

(51) Int. Cl.
*G10L 15/06* (2013.01)
*G10L 15/16* (2006.01)
*G10L 15/22* (2006.01)
*G10L 15/28* (2013.01)
*G10L 25/78* (2013.01)

(56) References Cited

U.S. PATENT DOCUMENTS

| | | | |
|---|---|---|---|
| 2021/0157834 A1* | 5/2021 | Sivasubramanian | G06F 16/686 |
| 2021/0201327 A1* | 7/2021 | Konig | G06Q 30/02 |
| 2021/0336905 A1 | 10/2021 | Bradley et al. | |
| 2022/0038578 A1 | 2/2022 | Koneru et al. | |
| 2023/0050482 A1 | 2/2023 | Vargas et al. | |
| 2023/0114150 A1* | 4/2023 | Lillelund | G10L 15/07 704/251 |
| 2023/0199116 A1* | 6/2023 | Koneru | G06F 40/35 379/88.01 |
| 2024/0144089 A1* | 5/2024 | Britt | G06N 20/00 |
| 2025/0106322 A1* | 3/2025 | Sakalkar | H04M 3/5175 |

* cited by examiner

GENERATING DATA FEATURES FROM SPEECH AND SENTIMENT ANALYTICS FOR ENHANCED PREDICTIVE ROUTING

BACKGROUND

The present invention generally relates to customer relations services and customer relations management via contact centers and associated cloud-based systems. More particularly, but not by way of limitation, the present invention pertains to the predictive routing of interactions for enhancing the matching of customer to agent.

Contact centers are used by many organizations to provide technical and other support to their end users and customers. Such customers may interact with human and/or virtual agents of the contact center by establishing electronic communications via one or more communication technologies including, for example, telephone, email, web chat, text, SMS, dedicated software applications, and/or other technologies. An important aspect to effective contact center operation lies in routing customer interactions to the right contact center agent. Identifying the best available agent to handle a given interaction promotes a good experience for the customer, reduces costs, and improves revenue for the business.

Contact centers traditionally employ skill-based routing for routing customer interactions. In traditional skill-based routing, the skill of an agent is one of the primary factors considered for determining whether the agent is equipped to deal with a particular interaction. The skill may relate to an agent's language proficiency, sales skill, certification, and the like. In this traditional approach to skill-based routing, explicit skill models are generated for the agents, and the skill models are used along with preset routing strategies for mapping the interactions to the agents. One drawback to traditional skill-based routing using explicit skill models is that the models are often static and do not dynamically adapt based on real-time changes to the environment. A drawback to skill-based models is that they require manual effort to construct and maintain. Thus, the more refined the skill model, the more costly it is. Further, there are new data available now that such models fail to leverage. Accordingly, what is desired is a system and method for matching customer interactions to agents to make those connections more optimal than matching based on traditional skill-based routing alone, where the matching is done using models that take advantage of new data types and that can be constructed and maintained with minimized manual effort.

BRIEF DESCRIPTION OF THE INVENTION

The present invention includes a method for processing data associated with interactions previously conducted by a contact center for training a predictive routing model. The method may include receiving the data associated with the previously conducted interactions. When described in relation to a first interaction of the interactions, the received data may include attribute data describing attributes of the first interaction, where the attribute data includes: interaction data describing one or more interaction attributes of the first interaction; customer data describing one or more customer attributes of a customer of the first interaction; agent data describing one or more agent attributes of an agent of the first interaction; and outcome data describing an outcome of the first interaction. The received data may further include: audio data that includes audio of a recording of a conversation occurring between a customer and an agent during the first interaction; and transcript data comprising text of the conversation of the first interaction as generated via automatic speech recognition from the audio data of the first interaction. The method may continue by performing speech analytics in relation to the received audio data of the interactions. When described in relation to the audio data of the first interaction, the speech analytics may include processing the audio data of the first interaction to determine one or more scores associated with one or more speech metrics. The one or more speech metrics may include a measure of an extent to which the agent or customer speaks during the conversation of the first interaction. The method may continue by performing sentiment analysis in relation to the transcript data of the interactions. When described in relation to the transcript data of the first interaction, the sentiment analysis may include processing the transcript data of the first interaction to determine one or more scores associated with one or more sentiment metrics. The one or more sentiment metrics may include a measure of a sentiment that is based on classifying utterances appearing in the transcript data of the first interaction as being positive or negative. The method may continue by performing feature engineering to generate feature data associated with the interactions, the generated feature data including: attribute features derived from attributes data; speech analytics features derived from the determined scores of the one or more speech metrics; and sentiment analysis features derived from the determined scores of the one or more sentiment metrics. The method may continue by generating a training data set from the feature data, the training dataset including attribute features, speech analytics features, and sentiment analysis features. The method may continue by applying a machine learning algorithm to the training dataset to train a predictive routing model based on patterns identified within the training dataset whereby agent-customer pairings are correlated with a performance measure of contact center that is based, at least in part, on the outcomes described by the outcome data.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components, wherein.

DETAILED DESCRIPTION

Figure 1:
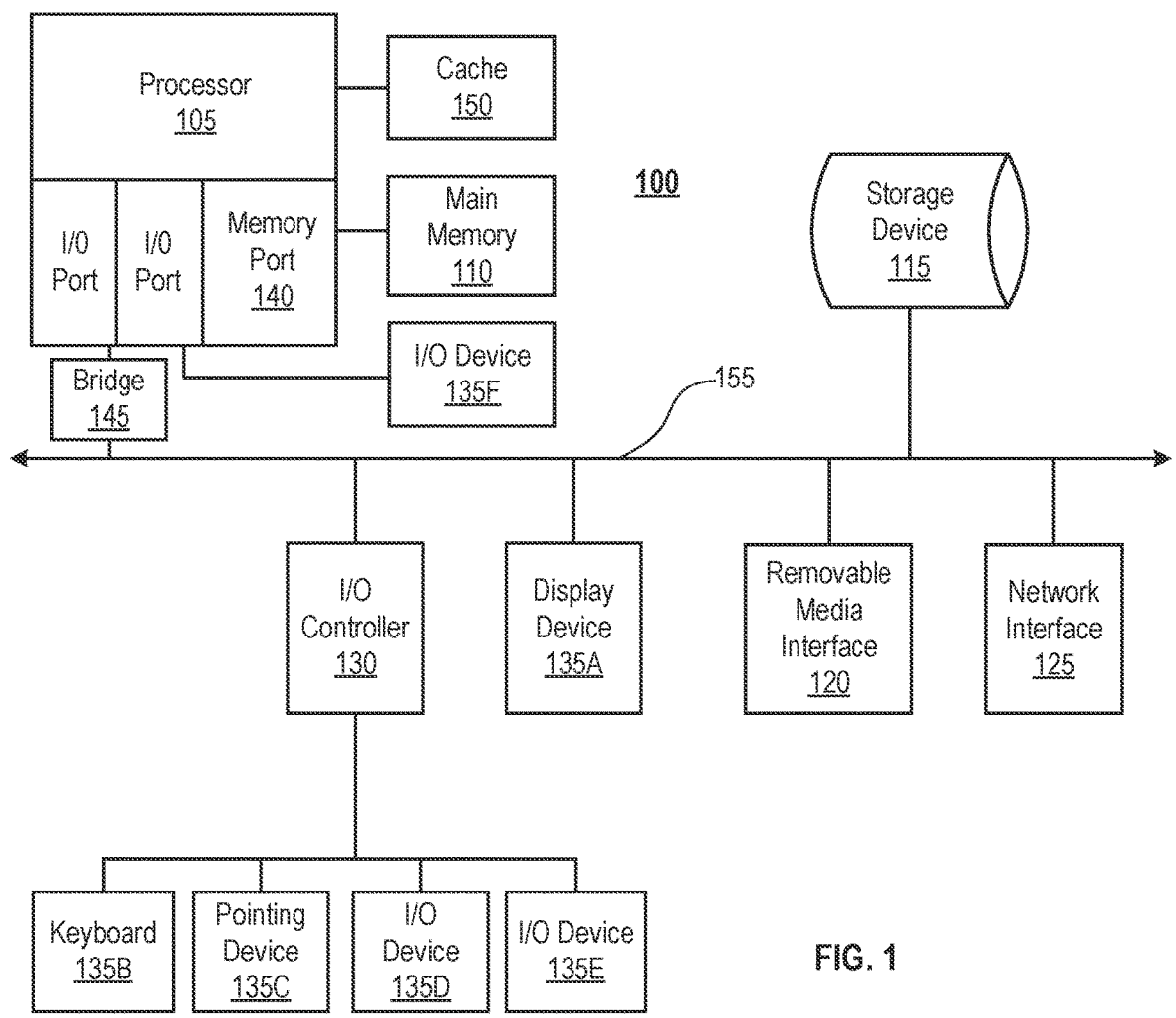
FIG. 1 depicts a schematic block diagram of a computing device in accordance with exemplary embodiments of the present invention and/or with which exemplary embodiments of the present invention may be enabled or practiced.

For the purpose of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. Additionally, further modification in the provided examples or application of the principles of the invention, as presented herein, are contemplated as would normally occur to those skilled in the art. Particular features, structures or characteristics may be combined in any suitable combinations and/or sub-combinations in one or more embodiments or examples. Those skilled in the art will recognize that various embodiments may be computer implemented using many different types of data processing equipment, with embodiments being implemented as an apparatus, method, or computer program product. Example embodiments, thus, may take the form of a hardware embodiment, a software embodiment, or combination thereof.

Computing Device

The present invention may be computer implemented using different forms of data processing equipment, for example, digital microprocessors and associated memory, executing appropriate software programs. By way of background, FIG. 1 illustrates a schematic block diagram of an exemplary computing device 100 in accordance with embodiments of the present invention and/or with which those embodiments may be enabled or practiced.

The computing device 100, for example, may be implemented via firmware (e.g., an application-specific integrated circuit), hardware, or a combination of software, firmware, and hardware. Each of the servers, controllers, switches, gateways, engines, and/or modules in the following figures (which collectively may be referred to as servers or modules) may be implemented via one or more of the computing devices 100. As an example, the various servers may be a process running on one or more processors of one or more computing devices 100, which may be executing computer program instructions and interacting with other systems or modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described in the following figures—such as, for example, the contact center 200 of FIG. 2—the various servers and computer devices thereof may be located on local computing devices 100 (i.e., on-site or at the same physical location as contact center agents), remote computing devices 100 (i.e., off-site or in a cloud computing environment, for example, in a remote data center connected to the contact center via a network), or some combination thereof. Functionality provided by servers located on off-site computing devices may be accessed and provided over a virtual private network (VPN), as if such servers were on-site, or the functionality may be provided using a software as a service (SaaS) accessed over the Internet using various protocols, such as by exchanging data via extensible markup language (XML), JSON, and the like.

As shown in the illustrated example, the computing device 100 may include a central processing unit (CPU) or processor 105 and a main memory 110. The computing device 100 may also include a storage device 115, removable media interface 120, network interface 125, I/O controller 130, and one or more input/output (I/O) devices 135, which as depicted may include an, display device 135A, keyboard 135B, and pointing device 135C. The computing device 100 further may include additional elements, such as a memory port 140, a bridge 145, I/O ports, one or more additional input/output devices 135D, 135E, 135F, and a cache memory 150 in communication with the processor 105.

The processor 105 may be any logic circuitry that responds to and processes instructions fetched from the main memory 110. For example, the processor 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The main memory 110 may be one or more memory chips capable of storing data and allowing stored data to be accessed by the central processing unit 105. The storage device 115 may provide storage for an operating system, which controls scheduling tasks and access to system resources, and other software. Unless otherwise limited, the computing device 100 may include an operating system and software capable of performing the functionality described herein.

As depicted in the illustrated example, the computing device 100 may include a wide variety of I/O devices 135, one or more of which may be connected via the I/O controller 130. Input devices, for example, may include a keyboard 135B and a pointing device 135C, e.g., a mouse or optical pen. Output devices, for example, may include video display devices, speakers, and printers. More generally, the I/O devices 135 may include any conventional devices for performing the functionality described herein.

Unless otherwise limited, the computing device 100 may be any workstation, desktop computer, laptop or notebook computer, server machine, virtualized machine, mobile or smart phone, portable telecommunication device, media playing device, or any other type of computing, telecommunications or media device, without limitation, capable of performing the operations and functionality described herein. The computing device 100 may include a plurality of such devices connected by a network or connected to other systems and resources via a network. Unless otherwise limited, the computing device 100 may communicate with other computing devices 100 via any type of network using any conventional communication protocol.

Contact Center

Figure 2:
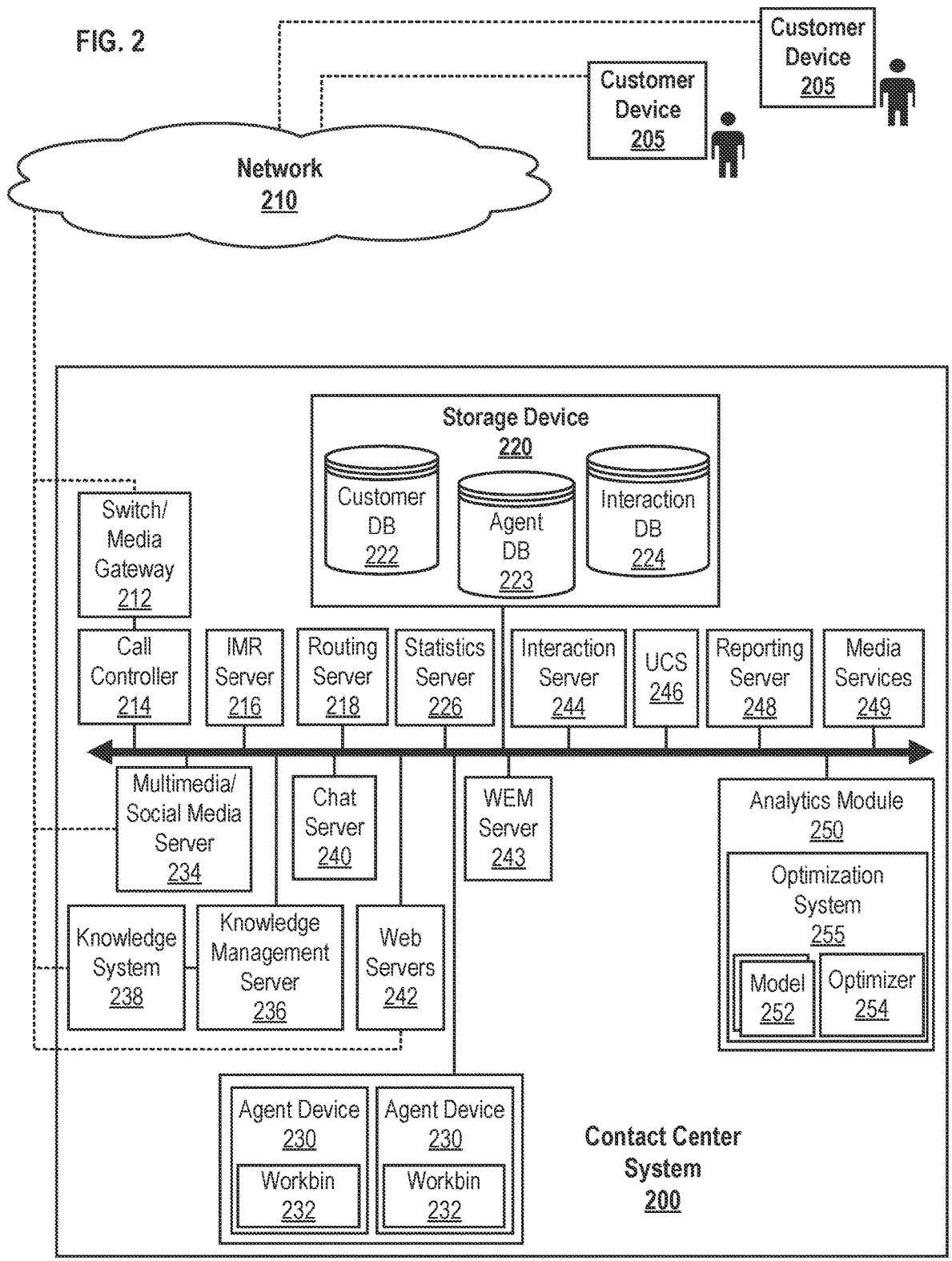
FIG. 2 depicts a schematic block diagram of a communications infrastructure or contact center in accordance with exemplary embodiments of the present invention and/or with which exemplary embodiments of the present invention may be enabled or practiced.

With reference now to FIG. 2, a communications infrastructure or contact center system (or simply "contact center") 200 is shown in accordance with exemplary embodiments of the present invention and/or with which exemplary embodiments of the present invention may be enabled or practiced. By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may assist customers in making purchasing decisions, receiving orders, or solving problems with products or services already received. Within a contact center, such interactions between agents and customers may be conducted over a variety of communication channels, such as, for example, via voice (e.g., telephone calls or voice over IP or VoIP calls), video (e.g., video conferencing), text (e.g., emails and text chat), screen sharing, co-browsing, or the like.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize automated processes in place of live agents, such as interactive voice response (IVR) systems, interactive media response (IMR) systems, internet robots or "bots", automated chat modules or "chatbots", and the like.

Referring specifically to FIG. 2, the contact center 200 may be used by a customer service provider to provide various types of services to customers. For example, the contact center 200 may be used to engage and manage interactions in which automated processes (or bots) or human agents communicate with customers. The contact center 200 may be an in-house facility of a business or enterprise for performing the functions of sales and customer service relative to products and services available through the enterprise. In another aspect, the contact center 200 may be operated by a service provider that contracts to provide customer relation services to a business or organization. Further, the contact center 200 may be deployed on equipment dedicated to the enterprise or third-party service provider, and/or deployed in a remote computing environment such as, for example, a private or public cloud environment with infrastructure for supporting multiple contact centers for multiple enterprises. The contact center 200 may include software applications or programs, which may be executed on premises or remotely or some combination thereof. It should further be appreciated that the various components of the contact center 200 may be distributed across various geographic locations.

Unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

In accordance with the illustrated example of FIG. 2, the components or modules of the contact center 200 may include: a plurality of customer devices 205; communications network (or simply "network") 210; switch/media gateway 212; call controller 214; interactive media response (IMR) server 216; routing server 218; storage device 220; statistics server 226; plurality of agent devices 230 that each have a workbin 232; multimedia/social media server 234; knowledge management server 236 coupled to a knowledge system 238; chat server 240; web servers 242; interaction server 244; universal contact server (or "UCS") 246; reporting server 248; media services server 249; an analytics module 250; and a XXXX server or module 251. It should be understood that any of the computer-implemented components, modules, or servers described in relation to FIG. 2 or in any of the following figures may be implemented via computing devices, such as the computing device 100 of FIG. 1. As will be seen, the contact center 200 generally manages resources (e.g., personnel, computers, telecommunication equipment, etc.) to enable the delivery of services via telephone, email, chat, or other communication mechanisms. The various components, modules, and/or servers of FIG. 2 (and other figures included herein) each may include one or more processors executing computer program instructions and interacting with other system components for performing the various functionalities described herein. Further, the terms "interaction" and "communication" are used interchangeably, and generally refer to any real-time and non-real-time interaction that uses any communication channel including, without limitation, telephone calls (PSTN or VoIP calls), emails, voicemails, video, chat, screen-sharing, text messages, social media messages, WebRTC calls, etc. Access to and control of the components of the contact system 200 may be affected through user interfaces (UIs) which may be generated on the customer devices 205 and/or the agent devices 230.

Customers desiring to receive services from the contact center 200 may initiate inbound communications (e.g., telephone calls, emails, chats, etc.) to the contact center 200 via a customer device 205. While FIG. 2 shows two such customer devices it should be understood that any number may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center 200, such as telephone calls, emails, chats, text messages, web-browsing sessions, and other multi-media transactions. Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include a wireless carrier network including a code division multiple access network, global system for mobile communications (GSM) network, or any wireless network/technology conventional in the art.

The switch/media gateway 212 may be coupled to the network 210 for receiving and transmitting telephone calls between customers and the contact center 200. The switch/media gateway 212 may include a telephone or communication switch configured to function as a central switch for agent routing within the center. The switch may be a hardware switching system or implemented via software. For example, the switch 215 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. In general, the switch/media gateway 212 establishes a voice connection between the customer and the agent by establishing a connection between the customer device 205 and agent device 230. The switch/media gateway 212 may be coupled to the call controller 214 which, for example, serves as an adapter or interface between the switch and the other routing, monitoring, and communication-handling components of the contact center 200. The call controller 214 may be configured to process PSTN calls, VOIP calls, etc. The call controller 214 may include computer-telephone integration (CTI) software for interfacing with the switch/media gateway and other components. The call controller 214 may extract data about an incoming interaction, such as the customer's telephone number, IP address, or email address, and then communicate these with other contact center components in processing the interaction.

The interactive media response (IMR) server 216 enables self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. Through continued interaction with the IMR server 216, customers may receive service without needing to speak with an agent. The IMR server 216 may ascertain why a customer is contacting the contact center so to route the communication to the appropriate resource.

The routing server 218 routes incoming interactions. For example, once it is determined that an inbound communication should be handled by a human agent, functionality within the routing server 218 may select the most appropriate agent and route the communication thereto. This type of functionality may be referred to as predictive routing. Such agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230, which may enhance the service the agent is able to provide.

Regarding data storage, the contact center 200 may include one or more mass storage devices—represented generally by the storage device 220—for storing data in one or more databases. For example, the storage device 220 may store customer data that is maintained in a customer database 222. Such customer data may include customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center 200 may include agent availability and agent profiles, schedules, skills, average handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center 200 in ways that facilitate the functionality described herein. For example, the servers or modules of the contact center 200 may query such databases to retrieve data stored therewithin or transmit data thereto for storage.

The statistics server 226 may be configured to record and aggregate data relating to the performance and operational aspects of the contact center 200. Such information may be compiled by the statistics server 226 and made available to other servers and modules, such as the reporting server 248, which then may produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 230 of the contact center 200 may be communication devices configured to interact with the various components and modules of the contact center 200 to facilitate the functionality described herein. An agent device 230, for example, may include a telephone adapted for regular telephone calls or VOIP calls. An agent device 230 may further include a computing device configured to communicate with the servers of the contact center 200, perform data processing associated with operations, and interface with customers via voice, chat, email, and other multimedia communication mechanisms according to functionality described herein. While only two such agent devices are shown, any number may be present.

The multimedia/social media server 234 may be configured to facilitate media interactions (other than voice) with the customer devices 205 and/or the servers 242. Such media interactions may be related, for example, to email, voice-mail, chat, video, text-messaging, web, social media, co-browsing, etc. The multi-media/social media server 234 may take the form of any IP router conventional in the art with specialized hardware and software for receiving, processing, and forwarding multi-media events and communications.

The knowledge management server 234 may be configured to facilitate interactions between customers and the knowledge system 238. In general, the knowledge system 238 may be a computer system capable of receiving questions or queries and providing answers in response. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art.

The chat server 240 may be configured to conduct, orchestrate, and manage electronic chat communications with customers. Such chat communications may be conducted by the chat server 240 in such a way that a customer communicates with automated chatbots, human agents, or both. The chat server 240 may perform as a chat orchestration server that dispatches chat conversations among chatbots and available human agents. In such cases, the processing logic of the chat server 240 may be rules driven so to leverage an intelligent workload distribution among available chat resources. The chat server 240 further may implement, manage and facilitate user interfaces (also UIs) associated with the chat feature. The chat server 240 may be configured to transfer chats within a single chat session with a particular customer between automated and human sources. The chat server 240 may be coupled to the knowledge management server 234 and the knowledge systems 238 for receiving suggestions and answers to queries posed by customers during a chat so that, for example, links to relevant articles can be provided.

The web servers 242 provide site hosts for a variety of social interaction sites to which customers subscribe, such as Facebook, Twitter, Instagram, etc. Though depicted as part of the contact center 200, it should be understood that the web servers 242 may be provided by third parties and/or maintained remotely. The web servers 242 may also provide webpages for the enterprise or organization being supported by the contact center 200. For example, customers may browse the webpages and receive information about the products and services of a particular enterprise. Within such enterprise webpages, mechanisms may be provided for initiating an interaction with the contact center 200, for example, via web chat, voice, or email. An example of such a mechanism is a widget, which can be deployed on the webpages or websites hosted on the web servers 242. As used herein, a widget refers to a user interface component that performs a particular function. In some implementations, a widget includes a GUI that is overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Such widgets may include additional user interfaces and be configured to access a variety of local resources (e.g., a calendar or contact information on the customer device) or remote resources via network (e.g., instant messaging, electronic mail, or social networking updates).

The interaction server 244 is configured to manage deferrable activities of the contact center and the routing thereof to human agents for completion. As used herein, deferrable activities include back-office work that can be performed off-line, e.g., responding to emails, attending training, and other activities that do not entail real-time communication with a customer.

The universal contact server (UCS) 246 may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer, such as data related to comments from agents, customer communication history, and the like. Each of these data types then may be stored in the customer database 222 or on other modules and retrieved as functionality described herein requires.

The reporting server 248 may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to a request and used toward managing the contact center in accordance with functionality described herein.

The media services server 249 provides audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, audio and video transcoding, secure real-time transport protocol (SRTP), audio or video conferencing, call analysis, keyword spotting, etc.

The analytics module 250 is generally configured to perform analytics on data received from a plurality of different data sources as functionality described herein requires. The analytics module 250 also may generate, update, train, and modify predictive models (or simply "models") 252 based on collected data, such as, for example, customer data, agent data, and interaction data. The models 252 may include behavior models of customers or agents that predict behavior in a variety of situations, thereby allowing interactions to be personalized and resources better allocated so to improve both contact center performance and customer experience. While the analytics module 250 is depicted as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, as discussed below, the analytic module 250 may be configured to retrieve data stored within the storage device 220 for use in developing and training algorithms and models 252, for example, by applying machine learning algorithms.

One or more of the included models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, it may be preferable that the models 252 are nonlinear, as nonlinear models can better represent curved rather than straight-line relationships. Given the foregoing requirements, a machine learning or neural network-based approach is presently a preferred embodiment for implementing the models 252. Neural networks, for example, may be developed based upon empirical data using advanced regression algorithms. The analytics module 250 may further include an optimizer 254. As will be appreciated, an optimizer may be used to minimize a "cost function" subject to a set of constraints, where the cost function is a mathematical representation of desired objectives or system operation. Because the models 252 may be non-linear, the optimizer 254 may be a nonlinear programming optimizer. It is contemplated, however, that the present invention may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like. The models 252 may further include time series forecasting models. According to exemplary embodiments, the models 252 and the optimizer 254 may together be used within an optimization system 255. For example, the analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, or other functionality related to the automated processes described herein.

Routing of Customer Interactions

Embodiments of the present invention are generally directed to systems and methods for optimized routing of customer interactions in a contact center that better meets real-time needs of the contact center, agents, and customers. As will be seen, such optimized routing helps to boost business value, lower costs for the contact center, and lower efforts of agents and customers in achieving a desired goal. The optimized routing of the present invention also brings about technical improvements in the field by allowing more efficient use of automated resources of the contact center. For example, the optimal routing of customer interactions may increase first call resolution that reduces repeat calls that use the technical resources of the contact center.

According to example embodiments, the optimized routing of customer interactions takes into account the customer profile data, intent, agent data, business goals, customer goals, interaction data, cross-channel interaction history, contact center statistics, personalities and behaviors of agents and customers, sentiment analytics, speech metrics, and/or actual agent performance results to optimally connect the customers and the agents. As feedback is received after a current interaction is complete, the system engages in machine learning based on the feedback to improve the routing of future interactions.

Figure 3:
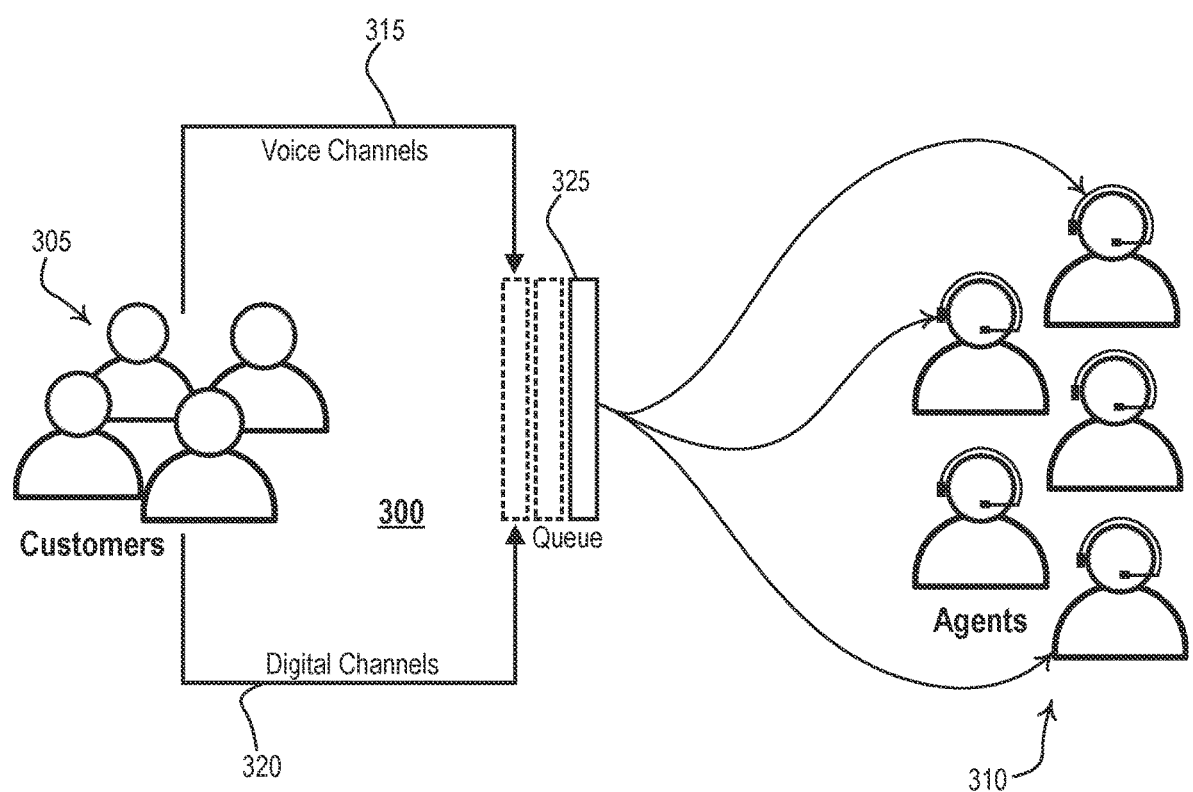
FIG. 3 is a schematic representation of a conventional routing system.

For background purposes, with reference to FIG. 3, a conventional system 300 is shown by which a contact center may connect customers 305 to agents 310 associated with a service provider. Generally, there are multiple communication channels available within a contact center for this to occur, for example, voice channels 315, such as phone calls, and digital channels 320, such as email, chat, message. Upon arriving at the contact center, such interactions are assigned to a queue 325 where the interactions wait until an agent becomes available to handle them. The interactions are then assigned to the agents 310 on a first-come/first-serve basis. This means that, when an interaction is next up for assigning to an agent, the agent that becomes available first is the agent that is assigned to the interaction. In many cases, this arrangement results in less than ideal matching of customers 305 to agents 310, with the assigned agent—i.e., the agent who became available first—not being the best agent among the agents on duty to the handle the given interaction. This leads to inefficient operations, increased costs, and squandered opportunities.

Contact centers then began using automated systems to desirably route incoming interactions to particular agents. Early routing systems were primarily intent based. Such systems would simply match an incoming interaction to an available agent based on the intent of the query, with the intent being matched to a static description of an agent's skillset. Later, predictive routers were developed that used more sophisticated routing rules and models. In these systems, agents were rated in multiple performance categories, and those ratings were more regularly updated with results from recently handled interactions. The rating categories, for example, might include performance data such as first call resolution rate, average handle time, customer satisfaction rate, etc. An agent would be selected not only on the nature of the query and his skillset, but also on performance. Customer profiles eventually were developed so that greater amounts of customer data could be used in the routing process. Advances in data collection increased the amount and variety of data being collected about customers and interactions. Such data proved valuable in finding insights that are useful in routing decisions.

Figure 4:
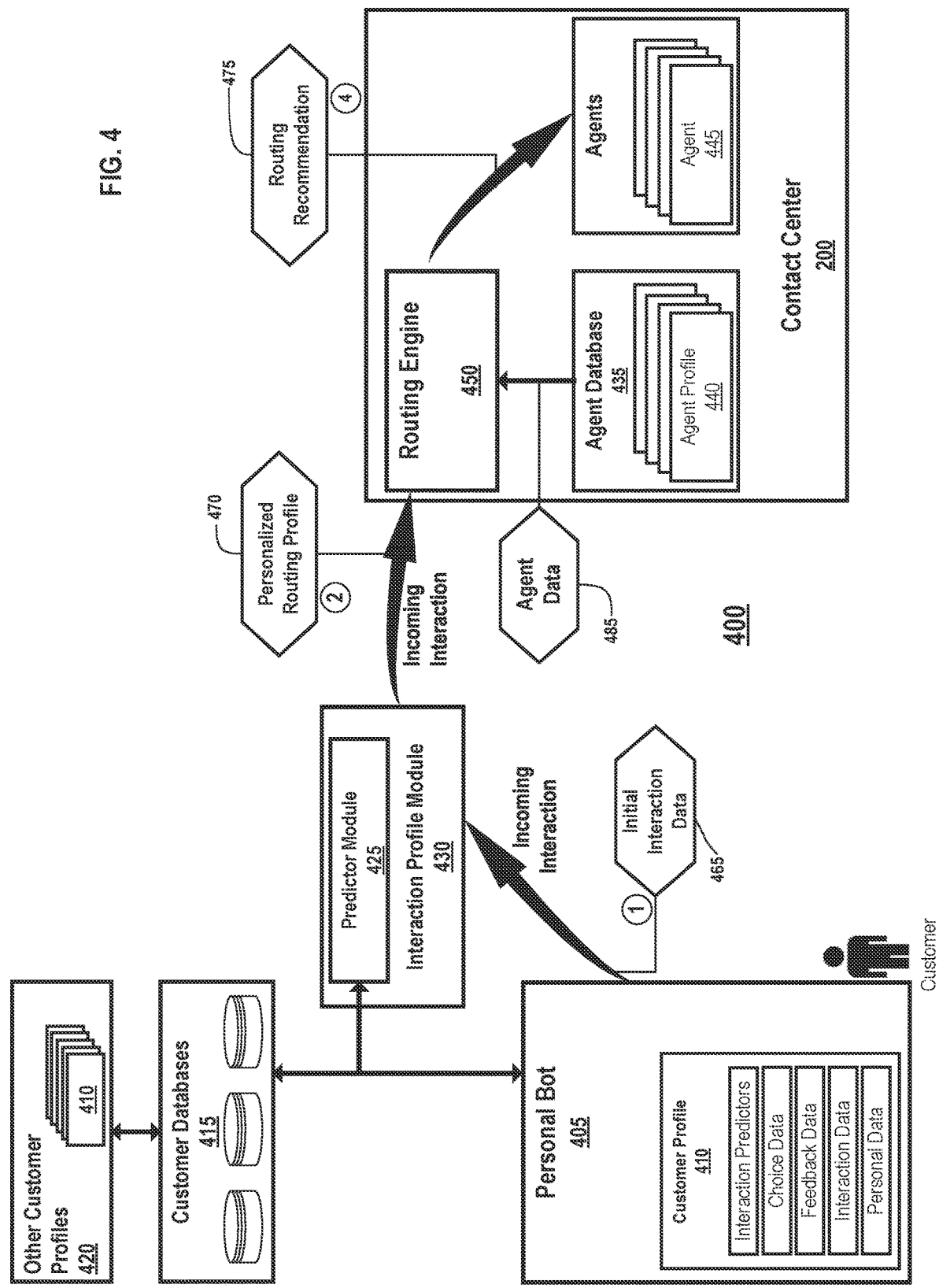
FIG. 4 is schematic representation of a predictive routing system within which aspects of the present invention may be practiced.
Figure 5:
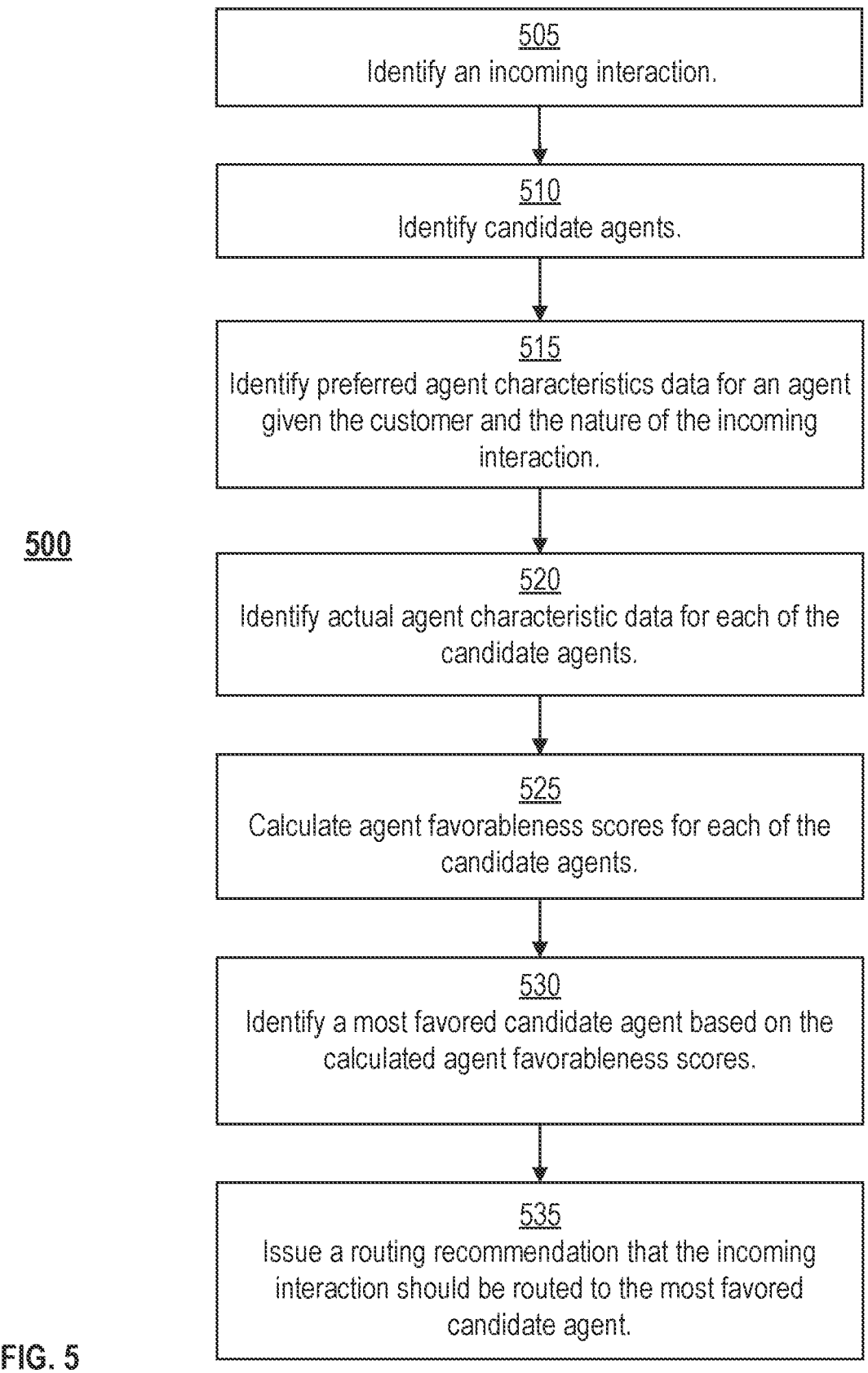
FIG. 5 is a predictive routing method in accordance with the system of FIG. 4.

With reference now to FIGS. 4 and 5, attention will now focus on an example by which incoming interactions are more intelligently routing. As will be appreciated, such systems and methods can improve routing of interactions by using algorithms that leverage data about customers, interactions, and agents to make favorable matches between agents and customers or agents and interactions.

With specific reference to FIG. 4, a system 400 is shown in which customer data is used to facilitate routing decisions that are personalized to individual customers. Contact centers often employ this type of intelligent or predictive routing in order to match incoming interactions from customers with available agents in order to better satisfy customers and/or further some business goal. Predictive routing can use particular ranking algorithms that uses certain techniques, such as machine learning, to build a model for optimal customer-agent pairing. As will be seen, there are multiple factors by which such pairing can be evaluated, such as, for example, knowledge and experience level of the agent, agent skill set, type of interaction, customer characteristics and preferences.

It should be understood that the routing systems and methods described herein are exemplary only and not meant to limit the types of routing that the present invention may be used with. As shown, the system 400 includes a personal bot 405, a customer profile 410, customer databases 415, other customer profiles 420, a predictor module 425, an interaction profile module 430, and a contact center 200. Further, the contact center 200 includes an agent database 435, agent profiles 440 corresponding to agents 445, and a routing engine 450.

Customer data that is stored in relation to the customer profile 410 may include several types of information, including for example, personal data, interaction data, feedback data, and/or choice data. Such aggregated and rich data sources may be used by modern routing systems to enable more accurate and reliable routing models and produce decisions that are more personalized to individual customers. In accordance with such systems, data driven analytics, such as machine learning, may be applied to particular datasets—for example, the personalized customer profile 410 and the customer databases 415—in order to improve automated routing of incoming customer interactions.

Customer profile data may be collected through the implementation of the personal bot 405 running on a customer device, such as any of those already described. Other methods of collecting customer profile data may also be used. According to exemplary embodiments, the personal bot 405 may gather information as the customer interacts with different contact centers, with the newly acquired data being used to dynamically update the customer profile 410 and customer databases 415 in real time. The personal bot 405, as used herein, may generally reference any customer-side implementation of applications or other automated processes that assists the customer to interact with contact centers or customer service providers. In regard to system architecture, the personal bot 405 may be implemented as a software program or application running on a mobile device or personal computing device of the customer, where the personal bot 405 facilitates the creation and maintenance of a personalized customer profile database or module (or simply "customer profile") 410.

For the sake of an example, a customer may have a mobile device or smart phone on which is running an application implementing local aspects of the personal bot 405. In setting up a customer profile 410, the personal bot 405 may serve as a means for the customer to input information. For example, the personal bot 405 may prompt and accept direct input of information from the customer by voice or text. The customer may also upload files to the personal bot 405 or provide the personal bot 405 with access to pre-existing databases or other files from which information about the customer may be obtained. The personal bot 405 also may gather information about the customer by monitoring customer behavior and actions through the customer's use of the device. For example, the personal bot 405 may collect data that relates to other activities that the customer performs through the device, such as email, text, social media, internet usage, etc. The personal bot 405 also may monitor and collect data from each of the interactions the customer has with customer service providers, such as a contact center 200, through the customer device. In this way, data may be collected from interactions occurring with many different contact centers. In use, at the conclusion of each interaction, the personal bot 405 of the present invention may update the profile of the customer in accordance with data gleamed from that interaction.

Once the customer profile is updated, it will include data associated with that most recent interaction as well as data from other past interactions. This updated or current dataset then may be analyzed in relation to one or more customer databases 415, which, as used herein, are data repositories housing customer data, such as interaction data relating to past interactions, from a large population of other customers. The analysis may be performed with the predictor module 425, which may include a machine learning algorithm that is configured to find data driven insights or predictors (or, as used herein, "interaction predictors"). As used herein, the interaction predictors represent a behavioral factor attributable to the customer given a type of interaction. The behavioral factor of the interaction predictor may include an emotional state, behavioral tendency, or preference for a particular customer given a type of interaction (also "interaction type"). The interaction predictor may be generated and applied in real time, for example, by the predictor module 425. Alternatively, the interaction predictors may be determined and stored in the customer profile 410 of a given customer as a way to augment or further personalize the profile. Such stored interaction predictors then may be applied in future interactions involving the customer when found relevant thereto. Thus, in general, a personal bot 405 may gather relevant information as a customer interacts with contact centers on his mobile device. The personal bot 405 may gather other types of information, as described above, and then may aggregate that data to build a highly personalized customer profile 410.

As indicated in the example of FIG. 4, the system 400 may be arranged such that the incoming interaction passes through three particular stages, though, it will be appreciated, that other configurations are also possible. First, the customer or personal bot 405 may initiate an incoming interaction with the contact center 200. In this initial stage, initial interaction data 465 is determined and transmitted (1) to the interaction profile module 430. Second, the interaction profile module 430 may then generate a personalized routing profile 470, which is transmitted (2) to a routing engine 450 of the contact center 200. The personalized routing profile 470 may be based on the initial interaction data 465 and other data stored about the customer, including any relevant interaction predictors. Third, the routing engine 475 generates (3) a routing recommendation 475 that is implemented via connecting the customer with a selected one of the agents. In making this recommendation, the routing engine 450 may take into account agent data 485 that is provided to the routing engine 450 via the agent database 435. The agent database 435 may include agent profiles 440 corresponding to the available agents 445. Such agent profiles may include agent experience, training, personality type, performance characteristics, etc.

The initial interaction data 465 may include data disclosing at least an intent of the incoming interaction and the contact center 200 for which the interaction is intended. Using this information, the incoming interaction may be classified as being a particular type of interaction. For example, a type of interaction may be defined by a particular type of intent or subject matter. This information may be used by the interaction profile module 430 to begin building the personalized interaction profile. As used therein, the personalized routing profile is a collection of data specifically tailored to a particular interaction of a particular customer. The personalized routing profile, thus, may include specific data pertaining to the interaction and the customer that is used to facilitate the routing of interactions in accordance customer preferences. According to exemplary embodiments, the interaction profile module 430 builds the personalized routing profile according to preferred agent characteristics data for the first customer for the given type of interaction. The interaction profile module 430 may include (or at least may communicate with) the predictor module 425, which, as described above, has access to data stored in the customer profile 410 and/or the customer databases 415. For example, contextual information or factors related to the incoming interaction may be identified, and based on those identified factors, predictions can be made about the customer by determining which of the stored interaction predictors are applicable. It should also be understood that such predictions about the customer may be made contemporaneously with the incoming interaction via the machine learning algorithm (or models developed therefrom) finding similarities in the contextual information around the incoming interaction and past interactions experienced by the customer and/or other similar customers within the customer databases 415. In either case, one or more interaction predictors applicable to the incoming interaction may be used to facilitate the delivery of services to the customer in relation to the incoming interaction. Thus, relevant interaction predictors along with any other relevant information from the customer profile 410 may be packaged within an interaction profile and then delivered to the contact center 200 for use thereby. The contact center 200 may then use this packaged data to facilitate decisions as to how the interaction should be routed and the nature of services that should be provided to the customer.

The routing engine 450 is a logic engine that makes routing decisions based on stored algorithms, models, rules, equations or other logic. In operation, the routing engine 450: a) receives data from the interaction profile module 430 that relates to the incoming interaction, i.e., the personalized routing profile 470; b) receives data maintained by the contact center 200 in the form of agent data 485; and c) applies logic to the received data to calculate a routing recommendation 475. The routing engine 450 and/or contact center 200 may then implement the routing recommendation 475 via connecting the incoming interaction with the selected one of the agents 445. Additional information related to predictive routing and the functionality of system 400 are provided in U.S. application Ser. No. 16/740,751, filed on Dec. 30, 2019 and published on Jul. 1, 2021 as US 2021-0204784, entitled "System and Method Relating to Customer Experience Automation", the content of which is incorporated herein by reference.

With specific reference now to FIG. 5, an exemplary routing method 500 is provided for selecting an agent to handle an incoming interaction based on customer preferences. As will be appreciated, the routing method 500 represents the processes that primarily occur within a routing engine, such as routing engine 450, and not the processes that occur within the interaction prediction module 430. The routing process 500 includes some specific terminology, which will now be defined in accordance with intended usage:

"first customer" is a reference customer that is associated with the example incoming interaction;

"incoming interaction" is a present communication (i.e., just instigated) between the first customer and a contact center;

"candidate agents" are two or more agents of the contact center that are available and/or otherwise qualified to handle the incoming interaction;

"agent criteria" are a set of agent characteristics or criterion, where each agent criterion defines a basis by which a characteristic of an agent can be rated or evaluated;

"preferred agent characteristics data" is data describing the preferences of the first customer in relation to the agent criteria;

"actual agent characteristics data" is data describing how a particular one of the candidate agents rates in relation to the agent criteria;

"agent favorableness score" is a score reflecting the favorableness of a particular one of the candidate agents based upon how closely the actual agent characteristics data, which rates the actual characteristics of the particular agent, matches the preferred agent characteristics data of the first customer (this idea can also be expressed as a "match favorableness score", i.e., the favorableness of a proposed match between an agent and customer) (Note that "agent favorableness score" also may reflect how such a matching furthers a KPI of the contact center, as described more below);

"evaluation of candidate agents" is an evaluation wherein an agent favorableness score is calculated for each of the available agents and, from the relative values of the calculated agent favorableness scores, a most favored candidate agent is identified;

"favored agent routing recommendation" is a routing recommendation that the incoming interaction of the first customer be routed to the most favored candidate agent.

In an example of operation, the routing process 500 may begin at step 505 where an incoming interaction is identified. The incoming interaction represents a communication between a customer and the contact center 200 that has been initiated, but not yet connected with an agent. For example, the incoming interaction may be a communication just instigated by a customer (referenced for the example as a "first customer") over any available communication channel. The incoming interaction may be identified by the interaction profile module 430 by initial interaction data 465 transmitted to it from the personal bot 405. The initial interaction data 465 may include data relating to the incoming interaction that is relevant to the building of the personalized routing profile 470. For example, the initial interaction data 465 may include data about the first customer and data about the interaction, such as the intent and other contextual factors related to the incoming interaction. Alternatively, the initial interaction data 465 may include very limited information, with additional information being retrieved by the interaction profile module 430 from connected databases, customer profiles, etc.

The routing process 500 continues at step 510 where candidate agents are identified. As used herein, candidate agents are two or more agents of the contact center that are available and/or otherwise qualified to handle the incoming interaction. In exemplary embodiments, the candidate agents may be identified by the contact center 200 after a prompt is provided. Such a prompt may be provided by the routing engine 450 upon identifying the incoming interaction (for example, upon receiving the personalized routing profile 470 from the interaction predictor module). The prompt may include information that is necessary for the contact center 200 to identify the candidate agents, such as, the intent of the incoming interaction.

The routing process 500 continues at step 515 where the preferred agent characteristics data for an agent is identified for the first customer. As used herein, preferred agent characteristics data is information describing the preferences of the first customer in relation to the agent criteria. As stated in the definitions above, the agent criteria are a set of agent criterion, where each criterion defines a basis by which a characteristic of an agent can be rated or evaluated. For example, an agent criterion may evaluate an aspect of an agent's personality, such as whether the agent is more playful or more serious. The preferred agent characteristics data may reflect that, for the incoming interaction, the first customer prefers a more playful agent.

In accordance with exemplary embodiments, the preferred agent characteristics data may be included within the data transmitted by the interaction profile module 430 in the personalized interaction profile. The preferred agent characteristics data may be determined by the interaction profile module 430 and may include predictions as to the preferences of the first customer. With access to data relating to each of the first customer's past interactions and other activities performed via the first customer's mobile device, customer-side systems (e.g., the personal bot 405, interaction profile module 430, and the predictor module 425) are generally well-positioned to make data driven inferences that provide the basis for such predictions. As will be seen, such predictions may be based on the intent of the incoming interaction and/or other contextual factors relating to the incoming interaction. For example, such predictions may be based on the applicability of one or more interaction predictors stored within the customer profile, such as those related to an emotional state of the customer or severity rating of the interaction.

The routing process 500 continues at step 520 where the actual agent characteristics data for each of the candidate agents is identified. As used herein, actual agent characteristics data is data describing how a particular candidate agent rates in relation to the agent criteria. As will be appreciated, the actual agent characteristics data for each of the agents may be stored within agent profiles 440 maintained in the agent database 435 of the contact center 200. The actual agent characteristics data may be part of the agent data 485 that is transmitted to the routing engine 450.

The routing process 500 continues by evaluating the candidate agents. As described more below, the evaluation of the candidate agents may include two steps: a) calculating an agent favorableness score for each of the available agents (step 525); and b) identifying, from the relative values of the calculated scores, a most favored candidate agent (step 530).

Thus, at step 525, the routing process 500 proceeds by calculating agent favorableness scores for each of the candidate agents. An agent favorableness score (also "match favorableness score") is a score reflecting the favorableness of particular one of the candidate agents based upon how closely the actual agent characteristics data, which describes the actual characteristics of the particular agent, matches the preferred agent characteristics data of the first customer. As will be appreciated, this may be accomplished using a variety of different scoring systems and algorithms. In general, the candidate agents will be scored via the agent criteria, with the score for each being indicative of how closely the actual agent characteristics data satisfies the preferred agent characteristics data of the first customer. For example, the agent favorableness score may be a cumulative score that reflects how well a particular agent scores in regard to all of the agent criteria. As another example, the scoring system may be a weighted one that places greater importance to certain agent criterion over others. In such cases, the weights applied to each category may be the same for all customers. Alternatively, the way the weights are applied could be varied between customers and, thus, be used as another mechanism to express different customer preferences.

At step 530, as stated above, the routing process 500 proceeds by identifying the most favored candidate agent based on the calculated agent favorableness scores. As will be appreciated, this step may be performed by comparing the relative values of the calculated agent favorableness scores and determining which is the best and, thus, reflective of a most favored agent given the first customer's preferences. The routing process 500 then continues at step 535 where a routing recommendation is issued. As will be appreciated, the routing recommendation may be that the incoming interaction is routed to the most favored candidate agent. This step may include the routing engine 450 transmitting the routing recommendation 475 so that the recommendations is implemented, i.e., the first customer is connected to the most favored candidate agent.

Figure 6:
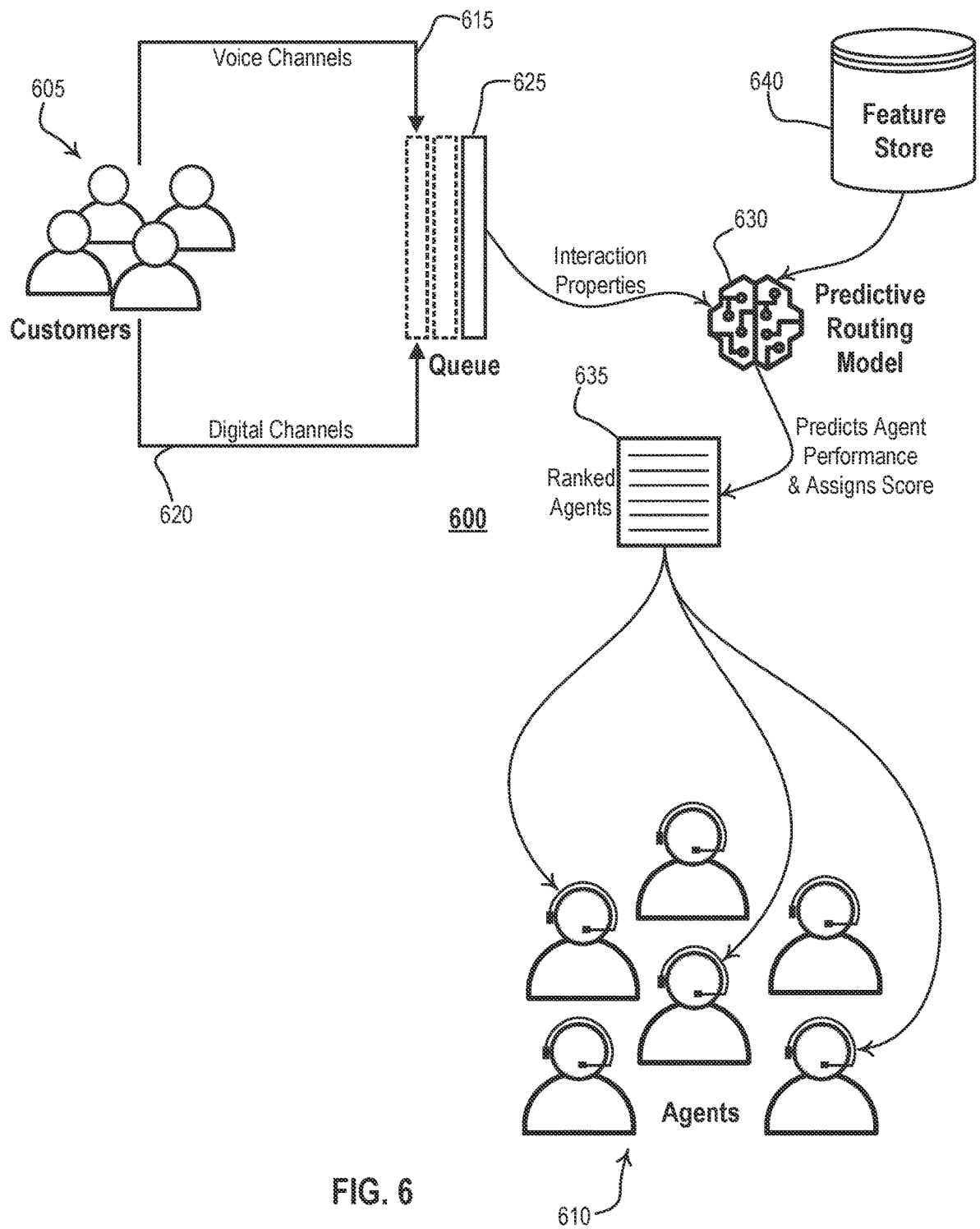
FIG. 6 is a schematic representation of a predictive routing system in accordance with exemplary operation of the present invention.

With reference to FIG. 6, an alternative system 600 is shown for performing predictive routing in a contact center. As before, customers 605 can connect with agents 610 via multiple communication channels, including voice channels 615 and digital channels 620. Once received by the contact center, the interactions are then assigned to a queue 625 where they wait until being assigned to an agent. In this case, interactions are assigned to agents pursuant to a ranking or scoring system. For example, a predictive routing model 630 may rank available agents 635 based on an ability to best handle a given interaction, which may be based on information gathered on the interaction, i.e., interaction properties, such as customer, intent, etc. The agent ranking 635 may be based on a score that is generated using a predictive routing model 630. The predictive routing model may be AI-based model that is configured to predict a score indicative as to how particular agents will perform in relation to a given interaction based on historical data. More specifically, the predictive routing model may be a machine learning model or deep learning model based on neural network structure. In such cases, the predictive routing model may be trained on a large number of aggregate feature properties of both customers and agents. As discussed below, such features may be derived from historical interactions handled by the contact center and then stored in a feature store 640. The training of the predictive routing model 630 may be altered to optimize a variety of contact center KPIs, with the score used to rank the agents indicating how well the candidate agents will perform in relation to one of the KPIs. Such KPIs, for example, may be average handle time of the call, sales revenue, etc. As will be appreciated, predictive routing can promote efficient operations, reduce costs, and promote optimal agent behaviors.

Figure 7:
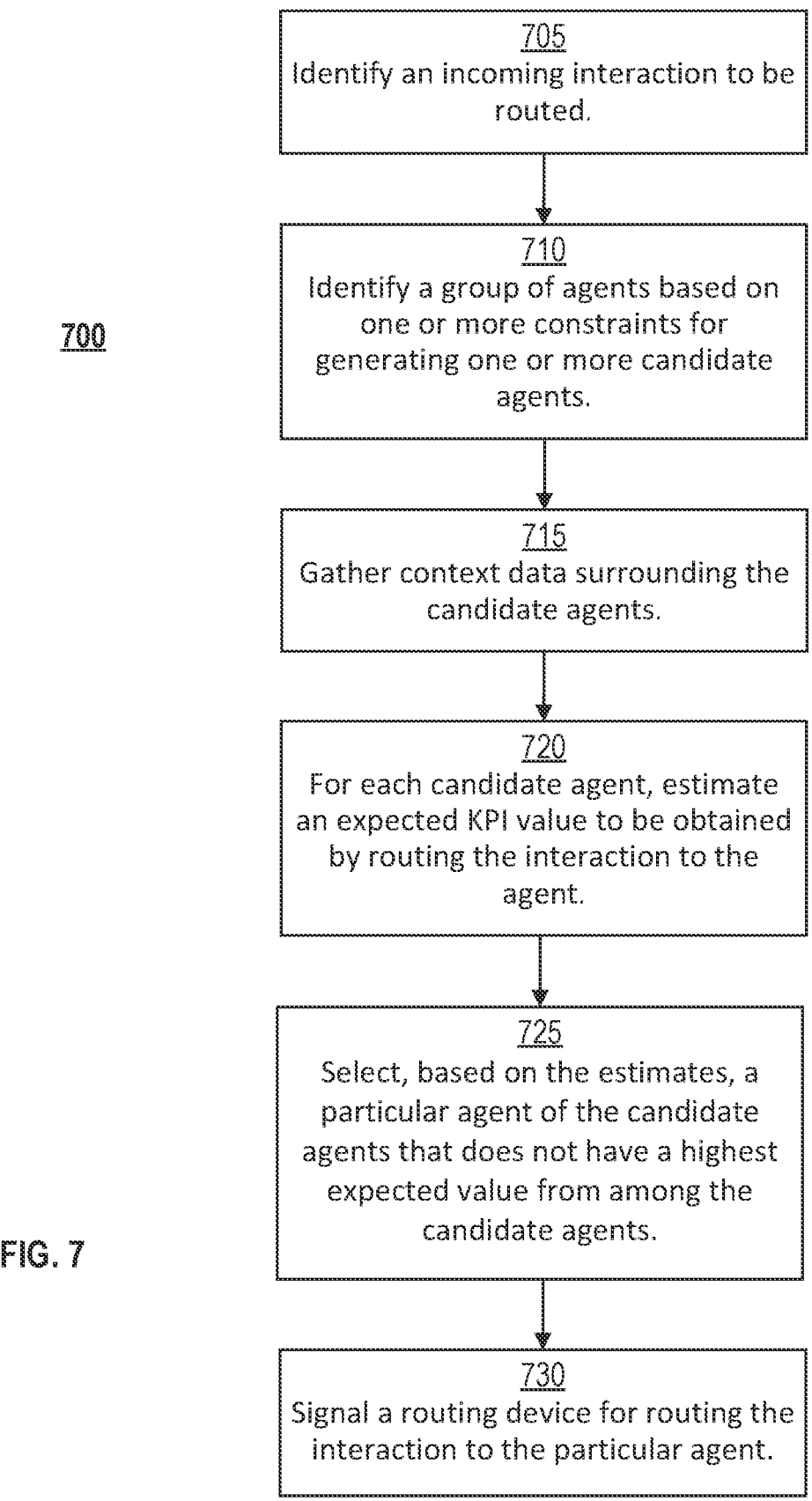
FIG. 7 is a method in accordance with aspects of the present invention.

With reference now to FIG. 7, a method 700 is shown by which this type of predictive routing may be performed. At step 705, the method 700 begins by identifying an incoming interaction to be routed. Within this step, interaction data regarding the incoming interaction may be gathered, such as interaction type, intent, customer data, etc. At a next step 710, the method 700 continues by identifying a group of agents based on one or more constraints for generating candidate agents. Constraints, for example, may include availability and ability to handle the incoming interaction.

At step 715, the process 700 includes gathering data regarding the candidate agents. Once this is gathered, at step 720, an expected KPI value is estimated for each of the candidate agents. More specifically, this may be done by inputting the data gathered regarding the incoming interaction and the candidate agents into the predictive routing model that is trained on historical data to provide an output that is the expected KPI value. As will be appreciated, the expected KPI value is a prediction based on correlations found in the historical data as to the KPI value if the incoming interaction is routed to a particular agent. At step 725, the method 700 continues by selecting, based on the estimates, a particular agent of the candidate agents that has the highest expected value from among the candidate agents. From there, at step 730, the method 700 may end by signaling a routing device to route the incoming interaction to the selected agent.

In this way, predictive routing may be used to leverage historical data to build models that score agents according to their suitability for optimizing a given key performance indicator (KPI) in a given interaction. Thus, for example, if a contact center administrator wants to optimize for average handle time (AHT), the predictive routing model may be trained to assign a high score for those agents who are likely to produce a low final handle time. The particular KPI of relevance may vary depending on the particular embodiment. For example, in other embodiments, the KPI being optimized may be customer satisfaction (CSAT), next contact avoidance (NCA), number of transfers, net promoter score (NPS), case resolution time (CRT), sales conversion, sales revenue, average wait time (AWT), first call resolution (FCR), and/or any other KPI. By leveraging predictive routing, a contact center administrator can control how interactions are distributed between agents and thereby achieve the optimum balance between outcome performance and other business objectives. Predictive routing may push calls towards those agents most likely to achieve a positive KPI outcome.

Figure 8:
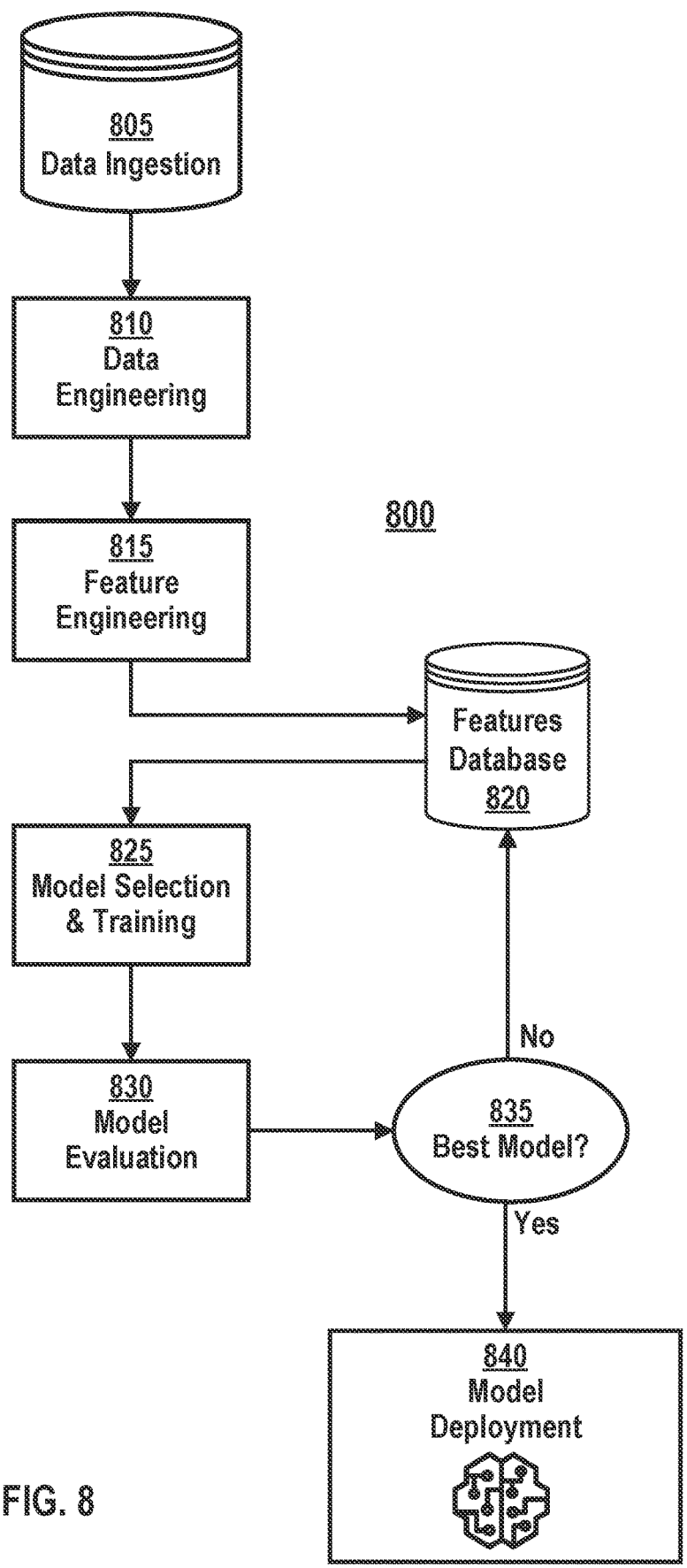
FIG. 8 is a schematic representation of data flow in accordance with aspects of the present invention.

With reference now to FIG. 8, an exemplary flow diagram 800 is shown that illustrates a process for collecting and storing property features or feature data and then using that data to train predictive models via machine learning algorithms. The process may begin at step 805 where raw data is ingested. During this initial step, for example, raw data is measured and collected from interactions occurring at the contact center and other sources. This data is then brought into the processing environment. Within this environment, at step 810, data engineering is performed. Data engineering generally includes cleaning, transforming, and preparing raw data for a next step that involves feature engineering.

At the next step 815, feature engineering is then performed. Feature engineering is the process of extracting features (characteristics, properties, attributes) from raw/processed data so that those features then can be readily used to train AI or machine learning models. Once extracted, the features may be stored in what will be referred to as a feature store 820. As will be appreciated, the feature store 820 is a data repository where features are collected and organized for the explicit purpose of being used to either train models or make predictions by applications that have a trained model. The feature store 820 further provides a central location where features or groups of features can be created from multiple different data sources or where new datasets can be created or updated from those feature groups and then used to train models or used in applications that are configured to retrieve features when needed to make predictions.

With the feature store 820 sufficiently developed, the flow diagram 800 moves into a second subprocess by which machine learning models are developed and deployed. At step 825, a type of model may be selected and then trained. For example, the predictive routing model may be trained on a prepared training dataset using various forms of selected machine learning algorithms. At step 830, the trained model may be evaluated. For example, this may be done using a testing dataset that was withheld from the training dataset. The trained model may be provided inputs associated with the testing dataset and asked to predict an output, for example, an expected KPI value. The predicted output is then compared to the actual output of the testing dataset to evaluate the trained model. Several different trained models may be evaluated. At step 835, it may be determined if the trained model is sufficiently effective to deploy, for example, whether it is better than the other trained models and/or more accurate than a predetermined accuracy threshold. If "No" the trained models do not satisfy these standards for deployment, the process may return to the feature store 820 where another model is trained for evaluation. If "Yes" one of the trained models does satisfy the standards for deployment, the trained model may be activated so that it is used to make realtime predictions in regard to incoming interactions. For example, a predictive routing model may be asked to calculate expected KPI values for respective candidate agents for selecting an agent to which to route an incoming interaction.

Figure 9:
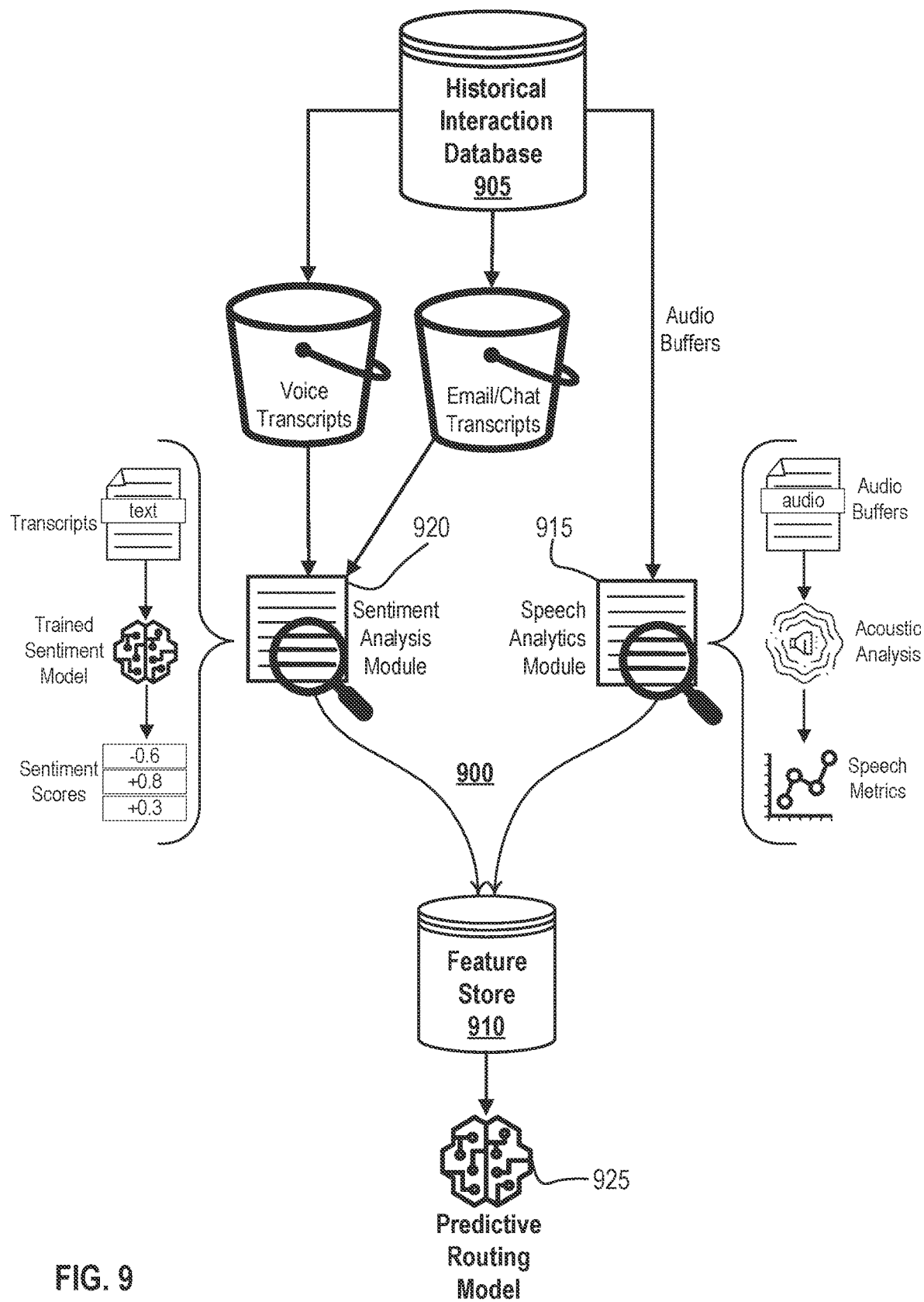
FIG. 9 is schematic representation of data processing system for mining feature data from historic interactions according to an embodiment of the present invention.

Turning now to FIG. 9, a schematic representation of a system 900 is shown for generating feature properties or feature data, which may be used to train enhanced predictive routing models. As depicted, according to an exemplary embodiment, the system 900 may include an historical interaction database 905, a feature store 910, a speech analytics module 915, a sentiment analysis module 920, and a predictive routing model 925. Before discussing functionality associated with the system 900, background will first be provided in relation to speech analytics and sentiment analysis.

Speech analytics refers to the process of extracting characteristics and attributes from audio recordings and, from that data, finding relevant and meaningful intelligence. In regard to the present invention, speech analytics may refer to the application of certain types of analysis to audio recordings of customer-agent conversations that occur within contact center interactions. As will be discussed below, in accordance with exemplary embodiments, one speech metric of the present invention relates to a measure as to how much an agent speaks and/or a customer speaks during a given customer-agent conversation. In accordance with exemplary embodiments, another speech metric of the present invention relates to a measure as to how much silence occurs during a given customer-agent conversation. This is a measure of the extent to which periods occur within the conversation where neither the agent nor the customer is talking. And, finally, in accordance with exemplary embodiments, another speech metric of the present invention is a measure of the extent to which periods occur within a given customer-agent conversation where an agent and customer are talking over each other. More specifically, this is a measure of the extent to which periods occur within the conversation where the agent and the customer are speaking at the same time. Such speech analytics may be derived in real time or from voice recordings of interactions per conventional systems and methods, as one of skill in the art would appreciate. The results of the speech analytics may be stored as feature data in a feature store 910. The feature data may be stored in association with other data collected from the interactions.

In regard to sentiment analysis, this is the process of understanding a customer's or agent's experience during an interaction based on the positivity or negativity of the language each uses in the interaction. For voice interactions, sentiment analysis may be performed on a transcript that is generated from the audio via automatic speech recognition. As an example, sentiment analysis may be performed by classifying each customer phrase or utterance as being positive, negative, or neutral attitude based on the language used. A sentiment score is assigned to a phrase based on the magnitude of positivity or negativity detected within that phrase. A sentiment marker representing the positive or negative phrase is placed in the interaction overview waveform and in the transcript. Subsequently, all of the positive and negative sentiment values may be used to calculate an overall sentiment score and/or a sentiment trend for the interaction. With this information, for example, a customer's feelings can be assessed towards products, brands, services, and/or an agent's competency. For example, the results from sentiment analysis can be used to search for a list of interactions with a high negative sentiment score to identify frustrated customer experiences, determine the root cause of the customer's frustration, provide customers with the solution they need, and ultimately improve the customer's experience.

An overall sentiment may be calculated for each interaction. For example, sentiment markers may be placed throughout the interaction audio and its corresponding transcript. Specifically, sentiment markers may be located in the interaction overview waveform at the exact time the phrase began and in the transcript at the beginning of the phrase. Every phrase associated with a sentiment analysis marker may be tagged with a positive or negative sentiment number, with the positive marker indicating a positive sentiment and the negative marker indicating a negative sentiment. The overall sentiment represents the customer's or agent's sentiment over the entirety of a particular interaction. The overall sentiment may be configured to range between a predetermined range, for example between scores of −100 and +100. The score may be calculated as all positive sentiments minus all negative sentiments. In other embodiments, the score weighs positive and negative markers throughout the interaction, for example, awarding more weight to events that took place towards the end of the interaction, to highlight the customer parting experience with the contact center. This can indicate if the customer was left satisfied or dissatisfied at the end of their interaction.

In addition to overall sentiment, a value for sentiment trend may also be calculated for each interaction. The sentiment trend is determined by comparing the sentiment events found in the first half of the interaction to the sentiment found in the second half of the interaction. For this reason, the sentiment trend may be updated when additional follow-ups occur within the same interaction. In some cases, only the customer phrases of the transcript are analyzed to detect sentiment events, with the agent phrases of the transcript being ignored in the sentiment trend calculation. There also may be a minimum number of customer phrases required for the sentiment trend to be calculated, usually around six or more customer phrases are required. Sentiment trend may be categorized or defined by the degree to which the sentiment changed during the interaction. For example, if the change is greater than +55, the sentiment trend may be defined as improving. If the change is between +20 and +55, the sentiment trend may be defined as slightly improving. If the change is between −20 and +20, the sentiment trend may be defined as no change. If the change is less than −20, the sentiment trend may be defined as slightly declining. And, if the change is less than −55, the sentiment trend may be defined as declining.

With specific reference to FIG. 9, the system 900 illustrates an embodiment of the present invention that can be used to derive certain types of customer and agent features from speech and text for enhancing models used for predictive routing. As stated, the system 900 may include a historical interaction database 905. The historical interaction database 905 may be a data repository configured for storing interaction data collected from past interactions, for example, voice calls, emails, chats, messages, texts, etc. Such interaction data may be derived from interactions that were previously handled by the contact center. This collection of interaction data may be used to create feature data related to agents, customers, and interactions. Conventional features, for example, may include average time an agent took to handle a call (or "average handle time") over a given time period, number of times a particular customer has been involved in purchasing a product within a given time period, as well as any others mentioned herein. In addition to such conventional features, the present invention proposes deriving other particular types of features using voice and speech data from historical interactions, which then may be used to train predictive routing models for enhanced operation. In accordance with exemplary embodiments, such features may be derived from metrics related to speech analytics and sentiment analysis, which will now be described in more detail.

In regard to speech analytics, exemplary embodiments may include detecting, measuring, or determining several particular types of speech metrics from audio recordings from past interactions. The results of these speech analytics may be aggregated and/or stored as feature data in the feature store 910. As depicted, the speech analytics may be performed within a speech analytics module 915 that accesses interaction data stored in the historical interaction database 905. Specifically, the speech analytics module 915 may receive audio data of past voice interactions (i.e., interactions conducted over a voice channel) that is stored within the historical interaction database 905. The speech analytics module 915 may then perform analytics on the received data, including acoustic analysis, and thereby calculate several particular attributes associated with the agent-customer conversations.

For example, in accordance with an exemplary embodiment, the audio data for a given customer-agent conversation may be recorded stereophonically, which is a recording of the conversation that contains two audio signals capturing the audio elements of the agent and customer in two separate channels. In such cases, each customer-agent conversation may be stored as a file that contains a recording for two audio channels, one channel that records the agent's voice and one channel that records the customer's voice. In regard to each customer-agent conversation, the speech analytics module 915 may separately analyze each of the customer and agent recordings and determine several characteristics or attributes. These attributes may include identifying periods when the agent is speaking, periods when the customer is speaking, periods when the agent is silent, and/or periods when the customer is silent. The timing for each of these periods within the conversation may also be determined and stored as conversation timeline data or, simply, timeline data. The conversation timeline data thus may record where each of the identified periods of speaking/silence occurs within the conversation. The timeline data further may record a conversation length of the customer-agent conversation (i.e., the total length of time it took for the conversation to occur). Once those conversation attributes are determined, the speech analytics module 915 may then use the data to calculate several speech metrics, which will now be discussed.

As introduced above, in accordance with exemplary embodiments, one speech metric relates to a measure as to how much the agent speaks and/or the customer speaks during a given customer-agent conversation. This speech metric may be referred to herein generally as a "speaking metric" of a given customer-agent conversation and may be expressed in several different ways. For example, the speaking metric may be given as an absolute length of time that each of the customer and agent speaks during a customer-agent conversation. In such cases, an agent speaking amount and customer speaking amount is calculated by totaling the times of the agent speaking periods and customer speaking periods, respectively, that are found in the customer-agent conversation. The speaking metric may further be given as a percentage that one or both of the participants is speaking during a given customer-agent conversation, for example, as a "customer speaking percentage" and/or "agent speaking percentage", with the percentage calculated in relation to the conversation length. In such cases, the customer speaking amount (i.e., the total time associated with the customer speaking periods) found in a given conversation is divided by the conversation length. The agent speaking amount may be similarly calculated as the agent speaking amount (i.e., the total time associated with the agent speaking periods) found in a given conversation divided by the conversation length. In other embodiments, the speaking metric may be expressed as a ratio that compares the customer speaking amount against the agent speaking amount. In such cases, for example, the ratio of the customer speaking amount to the agent speaking amount is calculated by first totaling the customer speaking periods and the agent speaking periods found in a given conversation and then dividing the total of the customer speaking periods by the total of the agent speaking periods. Or, in simpler terms, such a ratio is found by dividing the customer speaking amount by the agent speaking amount. As will be appreciated, in each of the above cases, the speaking metrics are readily calculable by the speech analytics module 915 given the above-described attributes that are measured in relation to customer-agent conversations.

In accordance with exemplary embodiments of the present invention, another speech metric relates to a measure as to how much silence occurs during a given customer-agent conversation. More specifically, this is a measure of the extent to which periods occur within the conversation where neither the agent nor the customer is talking. This speech metric may be referred to herein as a "silence metric" of a given customer-agent conversation and may be expressed in several different ways. For example, the silence metric may be given as a total time of silence within the given conversation, in which case it is referred to as a "silence amount". Thus the silence amount is calculated by totaling the times associated with the silence periods detected within the conversation. In addition, the silence metric may be given as a silence percentage, which is the percentage of the conversation in which silence occurs. The silence percentage is calculated by first totaling the silence periods found in a given conversation and then dividing the total by the conversation length. Or, in simpler terms, the silence percentage is found by dividing the silence amount by the conversation length. In other embodiments, the silence metric may include a ratio that compares the silence amount against the agent speaking amount or the customer speaking amount, which may be calculated by dividing the silence amount by the agent speaking amount or customer speaking amount, respectively. As will be appreciated, in each of the above cases, the silence metrics are readily calculable by the speech analytics module 915 given the above-described attributes measured in relation to the customer-agent conversations.

And, finally, in accordance with exemplary embodiments, another speech metric is the amount of time during a given customer-agent interaction that the agent and customer are talking over each other. More specifically, this is a measure of the extent to which periods occur within the customer-agent conversation where the agent and the customer are speaking at the same time. As used herein, this speech metric may be referred to herein as an "overlapping speech metric" of a given customer-agent conversation and may be expressed in several different ways. First, the overlapping speech metric may be given in terms of number of instances occurring within a given conversation, in which case, the number of instances when overlapping speech occurred within the conversation are totaled. Such a measure also may be given as number of instances occurring per time unit, such as, number of overlapping speech occurrences occurring per minute. Alternatively, the overlapping speech metric may be given as a total time of overlapping speech occurring within the given conversation, in which case it may be referred to as an "overlapping speech amount". The overlapping speech amount may be calculated by totaling the time associated with each of the periods of overlapping speech. In addition, the overlapping speech metric may be given as a overlapping speech percentage, which is the percentage the conversation during which speech overlaps. The overlapping speech percentage is calculated by totaling the time associated with each of the overlapping speech periods found in a given conversation and then dividing the total by the conversation length. Or, in simpler terms, the percentage is found by dividing the overlapping speech amount by the conversation length. In other embodiments, the overlapping speech metric may include a ratio that compares the overlapping speech amount against the agent speaking amount or the customer speaking amount, which may be calculated by dividing the overlapping speech amount by the agent speaking amount or customer speaking amount, respectively. As will be appreciated, in each of the above cases, the overlapping speech metrics are readily calculable by the speech analytics module 915 given the above-described attributes measured in relation to the customer-agent conversations.

In accordance with exemplary embodiments, the above-described speech metrics may be measured and recorded via the speech analytics model 915 in relation to interaction data (i.e., audio recording) received from the historical interaction database 905. The resulting speech metrics may then be aggregated, for example, over a time period, per customer, per agent, etc. The aggregated results then may be used to create aggregated feature properties. For example, a first aggregated feature property may include the total amount of overlapping speech for an agent or customer in a given week. As another example, a second aggregated feature property may be an average silence amount for an agent or customer in a given week. As another example, a third aggregated feature property may be the average agent speaking amount or customer speaking amount during interactions involving a particular agent during a given week.

In regard to sentiment analysis, as depicted in FIG. 9, the sentiment analysis module 920 may receive voice transcripts and/or email and chat transcripts from the historical interaction database 905. The interaction data may include transcribed text of the voice conversation that occurred between an agent and customer during a given interaction. Sentiment analysis may then be performed on the transcribed text. As will be understood, sentiment analysis is an analytic process whereby text is analyzed to determine if the emotional tone of the message is positive, negative, or neutral. The sentiment analysis module 920 may include a trained sentiment model that scores statements or utterances made in the customer-agent conversation according to sentiment. For example, sentiment may be expressed in a numerical values that range from −1 to +1. As will be appreciated, such values relate to how the customer was feeling during the interaction. A negative sentiment score indicates the unhappiness of a customer whereas a positive score relates to their satisfaction. Additionally sentiment trends, which, as described above, depict the change in customer sentiment values throughout the duration of the interaction, are also calculated.

Sentiment analysis may be done using a pretrained classifier that classifies each utterance as one of: negative/positive/neutral. In exemplary embodiments, the pretrained classifier may be a neural network that is first pretrained in an unsupervised manner on vast amounts of general text, which may be scrapped from the internet or from a range of sources. The pretrained classifier may be finetuned for the specific classification task, which in this case is classifying an utterance as one having a negative, positive, or neutral sentiment. For example, this training may be done using supervised (manually annotated) data. As an example, a RoBERTa model could be used as the pretrained classifier. The RoBERTa model is a neural network that uses the known transformer architecture with attention heads. As another example, a neural network known as XLMR may be used as a pretrained classifier. The XLMR model is similar to RoBERTa but has the advantage of being multilingual, i.e., the model is trained on many languages.

Similar to speech metrics, the sentiment scores and trends may then be aggregated over a predetermined timeframe or per customer or agent to create feature properties for storage within the feature store 910. For example, a feature property may be an average sentiment score of a customer during a given month (which can help identify unhappy customers). As another example, a feature property may be an average sentiment trend of an agent during a given week (which can help identify agents which are able to turn a negative customer sentiment into positive by the end of the interaction). Other feature properties known in the art are also possible.

Accordingly, voice interactions from the historical interaction database 905 may be analyzed as audio data by the speech analytics module 915 and as a voice transcript by the sentiment analysis module 920. Features associated with outcomes achieved during these interactions are also included for storage within the feature store 910. Thus, positive and negative outcomes associated with the interactions—for example, whether the issue was resolved, overall handle time, call transfers, whether a sale was made, customer reviews, etc.—can be included as feature properties with the feature store 910. In accordance with exemplary embodiments, these feature properties derived from the speech analytics module 915 and sentiment analysis module 920 are then used (in conjunction with other features derived from attributes data derived from past interactions) to train the predictive routing model 925, for example, via a machine learning algorithm. The predictive routing model 925 may be trained in relation to a particular KPI that is selected by a supervisor of the contact center. For example, the feature properties can help improve the capability of the predictive routing model 925 to optimize average time taken by agents to handle a call, to improve a percentage of sales made per interaction, etc. As an example, a machine learning algorithm may be applied to a training dataset that includes these types of features in order to train a predictive routing model. As will be appreciated, in such cases, the predictive routing model may be based on patterns identified within the training dataset via the machine learning algorithm whereby agent-customer pairings are correlated with a contact center performance measure, such as a selected KPI. Such a performance measure, or KPI, may be one that is derived, in whole or in part, from outcome data that is recorded in relation to past interactions, with such outcome data describing or classifying an outcome achieved by each of the interactions. Such outcome data may include, for example, customer satisfaction data, sales data, handle time, as well as any others listed herein.

Figure 10:
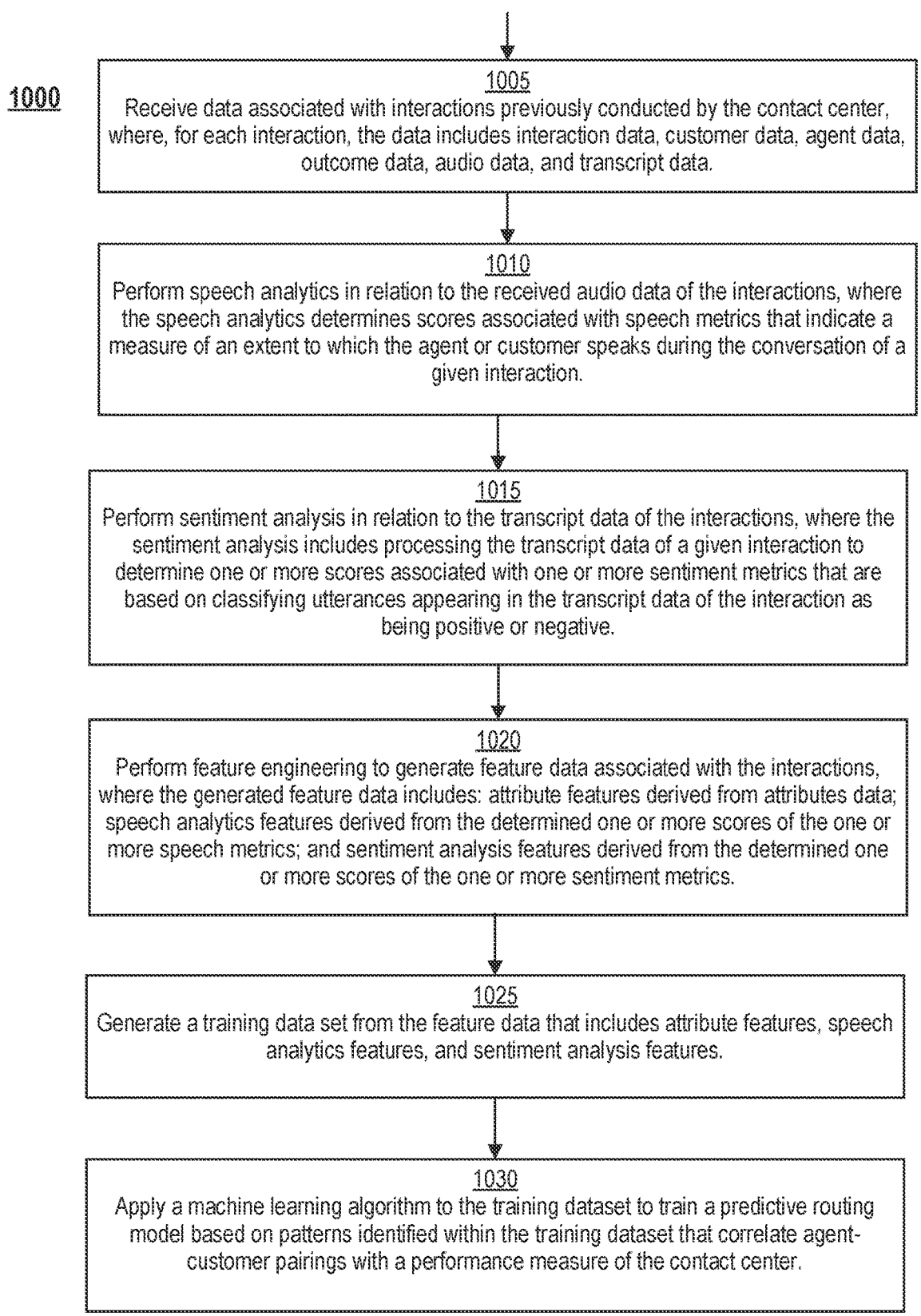
FIG. 10 is an exemplary method of exemplary operation of the system of FIG. 9 in accordance with an embodiment of the present invention.

With reference now to FIG. 10, a method 1000 is shown illustrating an exemplary embodiment of the present invention. As already described, the method 1000 is shown for processing data associated with interactions previously conducted by a contact center. The method 1000 may be used to process features for storage in a feature store and training a predictive routing model. Aspects of the method 1000 are described in relation to an exemplary "first interaction", with the method then being repeated in relation to a multitude of interactions so to generate the data and property features.

The method 1000 may begin, at step 1005, by receiving data associated with interactions previously conducted by the contact center. When described in relation to an exemplary first interaction of the previously conducted interactions, the received data may include attribute data describing attributes of the first interaction. The attribute data may include: interaction data describing one or more interaction attributes of the first interaction; customer data describing one or more customer attributes of a customer of the first interaction; agent data describing one or more agent attributes of an agent of the first interaction; and outcome data describing an outcome of the first interaction. The received data may further include audio data that includes audio of a recording of a conversation occurring between the customer and agent during the first interaction. The received data may further include transcript data that includes text of the conversation of the first interaction. The transcript data may be generated via automatic speech recognition from the audio data of the first interaction.

At step 1010, the method 1000 continues by performing speech analytics in relation to the received audio data of the interactions. For example, when described in relation to the audio data of the first interaction, the speech analytics may include processing the audio data of the first interaction to determine one or more scores associated with one or more speech metrics. The one or more speech metrics may include a measure of the extent to which the agent or customer speaks during the conversation of the first interaction.

At step 1015, the method 1000 continues by performing sentiment analysis in relation to the transcript data of the interactions. When described in relation to the transcript data of the first interaction, the sentiment analysis may include processing the transcript data of the first interaction to determine one or more scores associated with one or more sentiment metrics. The one or more sentiment metrics at least includes a measure of a sentiment based on classifying utterances appearing in the transcript data of the first interaction as being positive or negative.

At step 1020, the method 1000 continues by performing feature engineering to generate feature data associated with the interactions. The generated feature data may include: attribute features derived from attributes data; speech analytics features derived from the determined one or more scores of the one or more speech metrics; and sentiment analysis features derived from the determined one or more scores of the one or more sentiment metrics.

At step 1025, the method 1000 continues by generating a training data set from the feature data. The training dataset may include attribute features, speech analytics features, and sentiment analysis features.

At step 1030, the method 1000 continues by applying a machine learning algorithm to the training dataset to train a predictive routing model based on patterns identified within the training dataset that correlate agent-customer pairings with a performance measure of contact center. The performance measure, e.g., a KPI, may be based or derived, at least in part, on the outcomes described by the outcome data.

As one of ordinary skill in the art will appreciate, the many varying features and configurations described above in relation to the several exemplary embodiments may be further selectively applied to form the other possible embodiments of the present invention. For the sake of brevity and considering the abilities of one of ordinary skill in the art, each of the possible iterations is not provided or discussed in detail, though all combinations and possible embodiments embraced by the several claims below or otherwise are intended to be part of the instant application. Further, it should be apparent that the foregoing relates only to the described embodiments of the present application and that numerous changes and modifications may be made herein without departing from the spirit and scope of the present application as defined by the following claims and the equivalents thereof.

That which is claimed:

1. A method for processing data associated with interactions previously conducted by a contact center for training a predictive routing model, the method comprising:
    receiving the data associated with the previously conducted interactions, wherein, when described in relation to a first interaction of the interactions, the received data comprises:
        attribute data describing attributes of the first interaction, the attribute data including: interaction data describing one or more interaction attributes of the first interaction; customer data describing one or more customer attributes of a customer of the first interaction; agent data describing one or more agent attributes of an agent of the first interaction; and outcome data describing an outcome of the first interaction;
        audio data that comprises audio of a recording of a conversation occurring between a customer and an agent during the first interaction;
        transcript data comprising text of the conversation of the first interaction as generated via automatic speech recognition from the audio data of the first interaction;
    performing speech analytics in relation to the received audio data of the interactions, wherein, when described in relation to the audio data of the first interaction, the speech analytics comprises processing the audio data of the first interaction to determine one or more scores associated with one or more speech metrics, the one or more speech metrics including a measure of an extent to which the agent or customer speaks during the conversation of the first interaction;
    performing sentiment analysis in relation to the transcript data of the interactions, wherein, when described in relation to the transcript data of the first interaction, the sentiment analysis comprises processing the transcript data of the first interaction to determine one or more scores associated with one or more sentiment metrics, the one or more sentiment metrics including a measure of a sentiment that is based on classifying utterances appearing in the transcript data of the first interaction as being positive or negative;
    performing feature engineering to generate feature data associated with the interactions, the generated feature data including:
        attribute features derived from attributes data;
        speech analytics features derived from the determined scores of the one or more speech metrics;
        sentiment analysis features derived from the determined scores of the one or more sentiment metrics;
    generating a training data set from the feature data, the training dataset including attribute features, speech analytics features, and sentiment analysis features;
    applying a machine learning algorithm to the training dataset to train a predictive routing model based on patterns identified within the training dataset whereby agent-customer pairings are correlated with a performance measure of contact center that is based, at least in part, on the outcomes described by the outcome data.

2. The method of claim 1, wherein the one or more speech metrics include at least one of a speaking metric; a silence metric; and an overlapping speech metric; and
    wherein:
        the speaking metric comprises a measure as to how much the agent speaks and how much the customer speaks during the conversation of the first interaction;
        the silence metric comprises a measure as to how much silence occurs during the conversation of the first interaction; and
        the overlapping speech metric comprises a measure as to how much during the conversation of the first interaction that the agent and the customer are both talking at the same time.

3. The method of claim 2, wherein the one or more speech metrics comprises each of the speaking metric, the silence metric; and the overlapping speech metric.

4. The method of claim 3, wherein the speaking metric comprises a customer speaking amount, which is an absolute length of time that the customer speaks during the conversation of the first interaction, and an agent speaking amount, which is an absolute length of time that the agent speaks during the conversation of the first interaction.

5. The method of claim 3, wherein the speaking metric comprises at least one of a customer speaking percentage and an agent speaking percentage,
    wherein:
        the customer speaking percentage comprises an absolute length of time that the customer speaks during the conversation of the first interaction divided by a conversation length, which is a total time of the conversation of the first interaction; and
        the agent speaking percentage comprises an absolute length of time that the agent speaks during the conversation of the first interaction divided by the conversation length of the first interaction.

6. The method of claim 3, wherein the speaking metric comprises a ratio comparing a customer speaking amount against an agent speaking amount;
wherein:
the customer speaking amount comprises an absolute length of time that the customer speaks during the conversation of the first interaction; and
the agent speaking amount comprises an absolute length of time that the agent speaks during the conversation of the first interaction.

7. The method of claim 3, wherein the silence metric comprises a silence amount, the silence amount comprising an absolute length of time that silence occurs during the conversation of the first interaction.

8. The method of claim 3, wherein the silence metric comprises a silence percentage, the silence percentage comprising an absolute length of time that silence occurs during the conversation of the first interaction divided by a conversation length, which is a total time of the conversation of the first interaction.

9. The method of claim 3, wherein the silence metric comprises a ratio comparing a silence amount against at least one of a customer speaking amount and an agent speaking amount;
wherein:
the silence amount comprises an absolute length of time that silence occurs during the conversation of the first interaction;
the customer speaking amount comprises an absolute length of time that the customer speaks during the conversation of the first interaction; and
the agent speaking amount comprises an absolute length of time that the agent speaks during the conversation of the first interaction.

10. The method of claim 3, wherein the overlapping speech metric comprises an overlapping speech amount, the overlapping speech amount comprising an absolute length of time that overlapping speech occurs during the conversation of the first interaction.

11. The method of claim 3, wherein the overlapping speech metric comprises a overlapping speech percentage, the overlapping speech percentage comprising an absolute length of time that overlapping speech occurs during the conversation of the first interaction divided by a conversation length, which is a total time of the conversation of the first interaction.

12. The method of claim 3, wherein the overlapping speech metric comprises a ratio comparing an overlapping speech amount against at least one of a customer speaking amount and an agent speaking amount;
wherein:
the overlapping speech amount comprises an absolute length of time that overlapping speech occurs during the conversation of the first interaction;
the customer speaking amount comprises an absolute length of time that the customer speaks during the conversation of the first interaction; and
the agent speaking amount comprises an absolute length of time that the agent speaks during the conversation of the first interaction.

13. The method of claim 3, wherein the one or more sentiment metrics comprise at least one of: an overall sentiment; and a sentiment trend;
wherein:
the overall sentiment comprises a measure indicating a total number of utterances classified as positive versus a total number of the utterances classified as negative;
the sentiment trend comprises a measure that compares the positive and negative classifications occurring in a beginning half of the conversation against the positive and negative classifications occurring in an ending half of the conversation.

14. The method of claim 13, wherein the sentiment analysis is performed using a pretrained classifier model, the pretrained classifier model comprising a neural network configured to classify utterances as being a positive utterance or a negative utterance.

15. The method of claim 3, wherein the feature engineering comprises aggregating data for particular agents and particular customers over predetermined time frames.

16. The method of claim 15, wherein the interaction data comprises an interaction type defined by an intent.

17. A system for processing data associated with interactions previously conducted by a contact center for training a predictive routing model, the system comprising:
a processor; and
a memory storing instructions which, when executed by the processor, cause the processor to perform a process of:
receiving the data associated with the previously conducted interactions, wherein, when described in relation to a first interaction of the interactions, the received data comprises:
attribute data describing attributes of the first interaction, the attribute data including: interaction data describing one or more interaction attributes of the first interaction; customer data describing one or more customer attributes of a customer of the first interaction; agent data describing one or more agent attributes of an agent of the first interaction; and outcome data describing an outcome of the first interaction;
audio data that comprises audio of a recording of a conversation occurring between a customer and an agent during the first interaction;
transcript data comprising text of the conversation of the first interaction as generated via automatic speech recognition from the audio data of the first interaction;
performing speech analytics in relation to the received audio data of the interactions, wherein, when described in relation to the audio data of the first interaction, the speech analytics comprises processing the audio data of the first interaction to determine one or more scores associated with one or more speech metrics, the one or more speech metrics including a measure of an extent to which the agent or customer speaks during the conversation of the first interaction;
performing sentiment analysis in relation to the transcript data of the interactions, wherein, when described in relation to the transcript data of the first interaction, the sentiment analysis comprises processing the transcript data of the first interaction to determine one or more scores associated with one or more sentiment metrics, the one or more sentiment metrics including a measure of a sentiment that is based on classifying utterances appearing in the transcript data of the first interaction as being positive or negative;

performing feature engineering to generate feature data associated with the interactions, the generated feature data including:
attribute features derived from attributes data;
speech analytics features derived from the determined scores of the one or more speech metrics;
sentiment analysis features derived from the determined scores of the one or more sentiment metrics;

generating a training data set from the feature data, the training dataset including attribute features, speech analytics features, and sentiment analysis features; and applying a machine learning algorithm to the training dataset to train a predictive routing model based on patterns identified within the training dataset whereby agent-customer pairings are correlated with a performance measure of contact center that is based, at least in part, on the outcomes described by the outcome data.

18. The system of claim 17, wherein the one or more speech metrics include at least one of a speaking metric; a silence metric; and an overlapping speech metric; and wherein:
the speaking metric comprises a measure as to how much the agent speaks and how much the customer speaks during the conversation of the first interaction;
the silence metric comprises a measure as to how much silence occurs during the conversation of the first interaction; and
the overlapping speech metric comprises a measure as to how much during the conversation of the first interaction that the agent and the customer are both talking at the same time.

19. The system of claim 18, wherein the one or more sentiment metrics comprise at least one of: an overall sentiment; and a sentiment trend;
wherein:
the overall sentiment comprises a measure indicating a total number of utterances classified as positive versus a total number of the utterances classified as negative;
the sentiment trend comprises a measure that compares the positive and negative classifications occurring in a beginning half of the conversation against the positive and negative classifications occurring in an ending half of the conversation;
wherein the sentiment analysis is performed using a pretrained classifier model, the pretrained classifier model comprising a neural network configured to classify utterances as being a positive utterance or a negative utterance.

20. The system of claim 19, wherein the feature engineering comprises aggregating data for particular agents and particular customers over predetermined time frames; and
wherein the interaction data comprises an interaction type defined by an intent.

* * * * *